United States Patent
Narasimha et al.

(10) Patent No.: US 9,325,480 B2
(45) Date of Patent: Apr. 26, 2016

(54) METHODS AND DEVICE FOR PERFORMING DEVICE-TO-DEVICE COMMUNICATION

(71) Applicant: MOTOROLA MOBILITY LLC, Libertyville, IL (US)

(72) Inventors: Murali Narasimha, Lake Zurich, IL (US); Vijay Nangia, Algonquin, IL (US); Ravikiran Nory, Buffalo Grove, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 210 days.

(21) Appl. No.: 13/938,323

(22) Filed: Jul. 10, 2013

(65) Prior Publication Data

US 2015/0016428 A1 Jan. 15, 2015

(51) Int. Cl.
*H04J 3/00* (2006.01)
*H04L 5/00* (2006.01)
*H04W 24/02* (2009.01)
*H04W 56/00* (2009.01)

(52) U.S. Cl.
CPC ............. *H04L 5/0058* (2013.01); *H04W 24/02* (2013.01); *H04W 56/0045* (2013.01)

(58) Field of Classification Search
None
See application file for complete search history.

(56) References Cited

U.S. PATENT DOCUMENTS

| | | | |
|---|---|---|---|
| 8,068,454 B2 | 11/2011 | Bonta et al. | |
| 2010/0093364 A1 | 4/2010 | Ribeiro et al. | |
| 2011/0182280 A1* | 7/2011 | Charbit et al. | 370/350 |
| 2011/0255450 A1 | 10/2011 | Wang et al. | |
| 2011/0275382 A1 | 11/2011 | Hakola et al. | |
| 2011/0310882 A1 | 12/2011 | Li et al. | |
| 2012/0014371 A1 | 1/2012 | Weng et al. | |
| 2012/0127964 A1 | 5/2012 | Turtinen et al. | |
| 2012/0178482 A1 | 7/2012 | Seo et al. | |
| 2014/0112308 A1* | 4/2014 | Kwon et al. | 370/331 |

FOREIGN PATENT DOCUMENTS

| | | |
|---|---|---|
| WO | 2010035100 A1 | 4/2010 |
| WO | 2013104084 A1 | 7/2013 |

OTHER PUBLICATIONS

Fodar, Gabor et al: "Design Aspects of Network Assisted Device-to-Device Communications", IEEE Communications Magazine, Mar. 2012, pp. 170-177.
International Search Report and Written Opinion for Application No. PCT/us2014/045919 dated Jan. 30, 2015.

* cited by examiner

*Primary Examiner* — Minh-Trang Nguyen
(74) *Attorney, Agent, or Firm* — Lerner, David, Littenberg, Krumholz & Mentlik, LLP

(57) ABSTRACT

Disclosed are methods for carrying out device-to-device ("D2D") communication. In one implementation, a user equipment ("UE") communicates D2D with another UE using uplink radio resources. The first UE receives a downlink signal from a base station and determines the reception time. The first UE also receives a timing advance for uplink communication. Based on the reception time and the timing advance, the first UE determines an uplink transmission time. When transmitting to the second UE, however, the first UE does not transmit at the determined UL transmission time. Rather, the first UE delays its D2D transmission for a period of time that is based on the second UE's uplink timing advance.

14 Claims, 22 Drawing Sheets

METHODS AND DEVICE FOR PERFORMING DEVICE-TO-DEVICE COMMUNICATION

TECHNICAL FIELD

The present disclosure is related generally to wireless network communications and, more particularly, to device-to-device communication.

BACKGROUND

The demand for data capacity in wireless networks has increased dramatically with the widespread use of smartphones and tablet computers. In addition to using traditional voice services, consumers now expect to use their wireless devices to watch streaming video, play on-line games, and transfer large files. This has put a significant load on wireless networks. Despite advances in cellular technology, capacity is still an issue that wireless service providers have to consider.

To help alleviate the problem of limited bandwidth, techniques have been developed to allow wireless devices such as cell phones to communicate directly with one another without having to use a network as an intermediary. These techniques are generally referred to as Device-to-Device ("D2D") communication or simply D2D.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
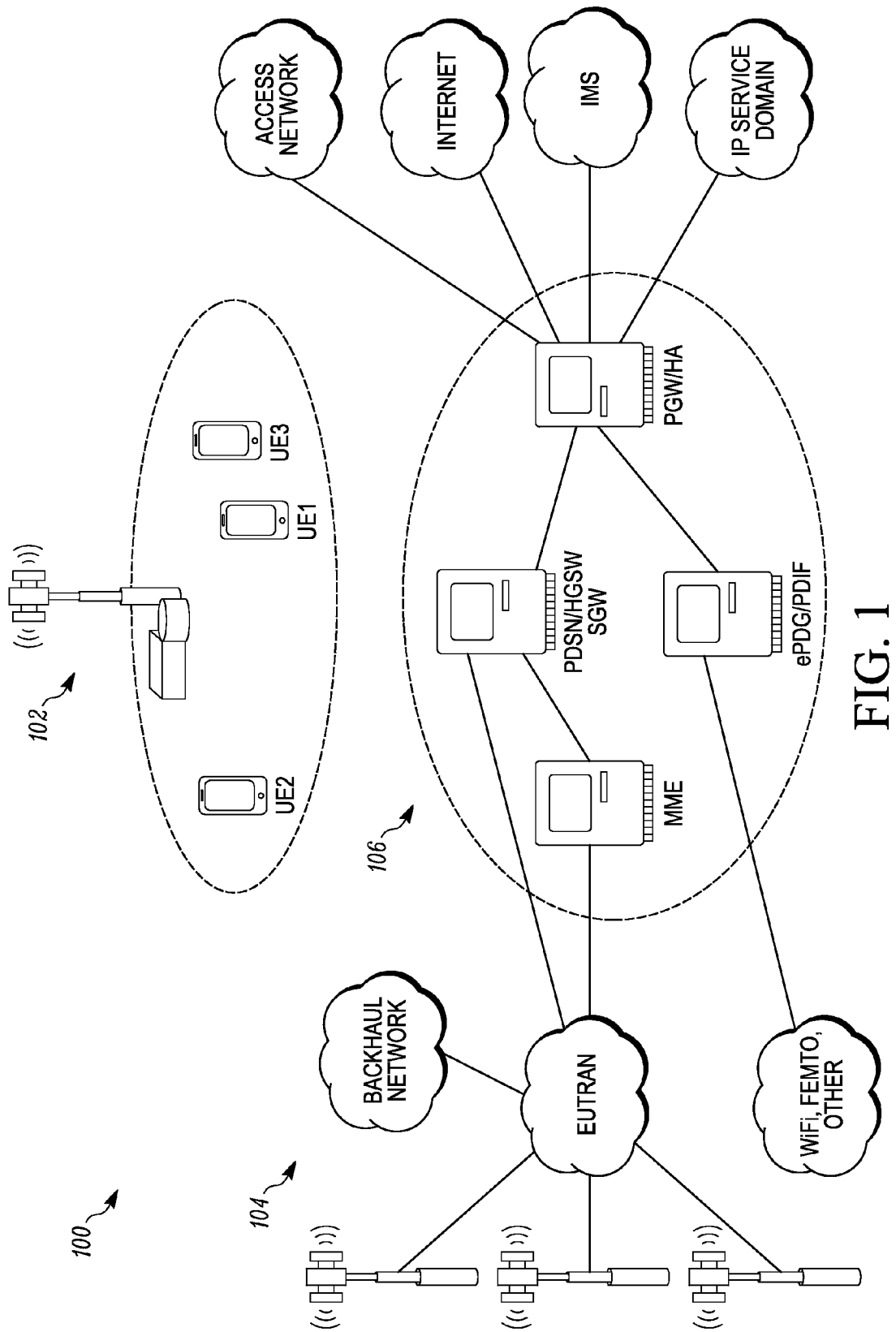
FIG. 1 shows a representative communication system.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

When D2D is employed in a wireless network, each D2D-capable device generally needs to maintain its own connection to a base station of the network even while communicating with another device using D2D. This is because the base station manages the radio resources that the devices use for D2D. The base station also regulates the behaviour of the devices with regard to discovery and interference mitigation. The D2D-capable devices that maintain connection to a base station of the network are considered in-network D2D devices, and the D2D-capable devices that do not maintain a connection to a base station of the network are considered out-of-network D2D devices.

One way for a wireless device to carry out D2D communication and still be able to communicate with a base station is for the wireless device to transmit to the base station and to a D2D peer in alternating subframes.

One challenge that arises in D2D communication is that the timing required for communicating with the base station may be out of sync with the timing of D2D communications. For example, to ensure that transmissions from different devices arrive at the base station at the same time or within a receive window, the base station assigns a timing advance ("TA") to each device. The TA is relative to the downlink transmission (from the base station) reception time at the device or, in other words, the device's base station-receive timing. The value of the TA assigned to a device is generally based on the propagation delay from the base station to the device. These TAs can negatively impact D2D communication, however.

Figure 7:
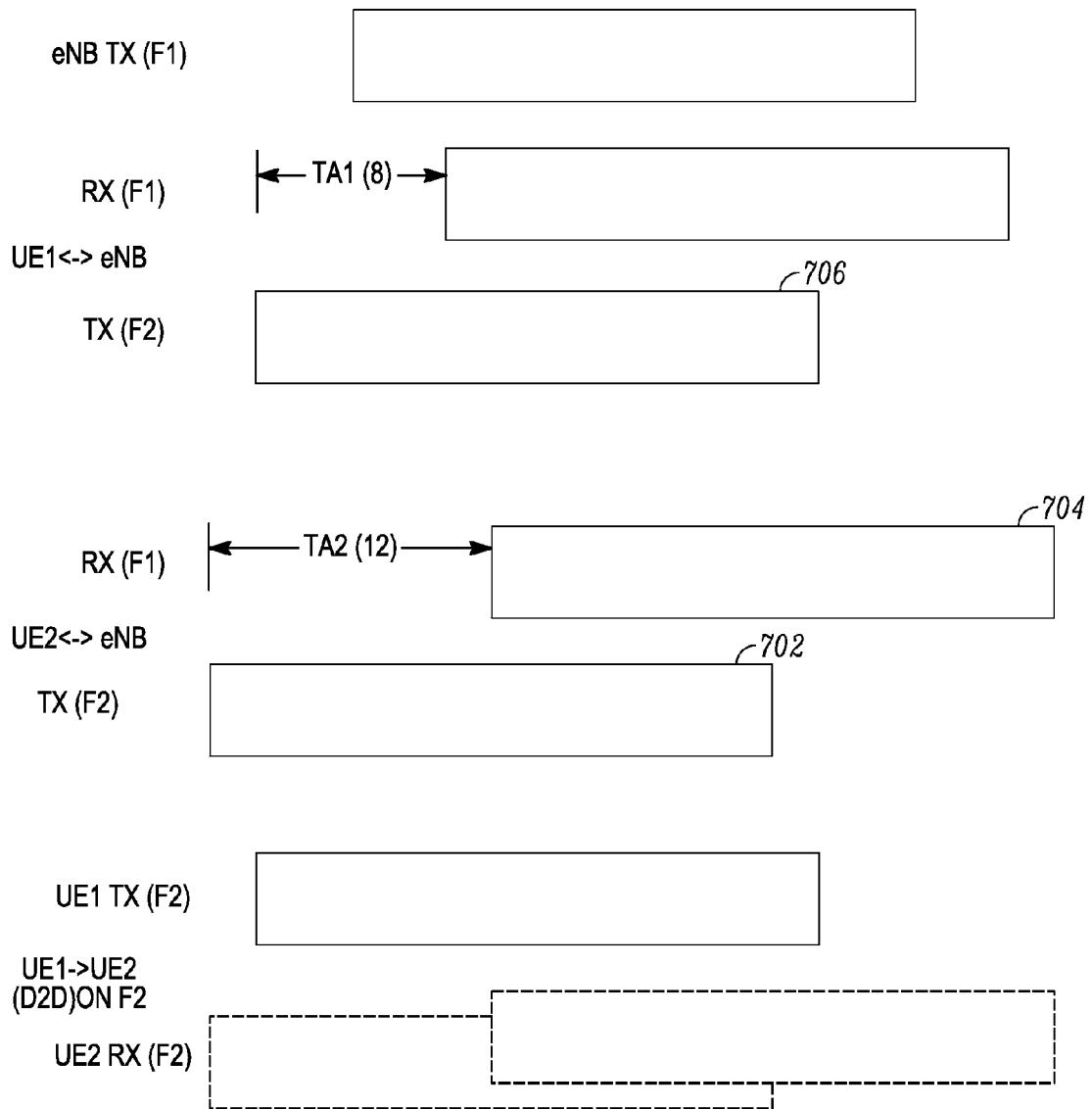
FIG. 7 illustrates the concept of a timing advance.

Referring to FIG. 7 for example, UE2 has a timing advance of TA2 for its uplink transmission 702 relative to its downlink reception 704. But it is not clear how UE2 would determine where to start and where to end its reception of a D2D subframe received from UE1. If UE2 aligns its D2D-receive timing with its base station-receive timing, then its D2D-receive timing would be late. Aligning its D2D-receive timing with its base station-transmit timing (i.e., aligning UE2's transmit timing to the base station with TA2) would cause its D2D-receive timing to be too early.

To address these issues, the present disclosure describes a method for performing D2D communication. In one embodiment, a first UE communicates D2D with a second UE using uplink radio resources. The first UE receives a downlink signal from a base station and determines its reception time. The first UE also receives an indication of a timing advance for uplink communication from the first UE to the base station. Based on the determined reception time and the indicated timing advance, the first UE determines an uplink transmission time for the first UE for uplink communications to the base station. When transmitting to the second UE, however, the first UE does not transmit at the determined uplink transmission time. Rather, the first UE delays its D2D transmission for a period of time (relative to the determined uplink time) that is based on the second UE's uplink timing advance.

In another embodiment, the first UE applies one timing advance to its uplink transmissions and another timing advance to its D2D-receive timing.

In still another embodiment, the first UE communicates with the second UE using a larger cyclic prefix than it uses in its communication with the base station.

In yet another embodiment, the first UE communicates with a second UE over a series of D2D consecutive subframes. The first subframe in the series includes a guard period whose length is based on the timing advance of the first UE and the timing advance of the second UE. During the guard period, the first UE reconfigures its receiver from a first tuning state (for receiving from the base station) to a second tuning state (for receiving from the second UE). In another embodiment, it is the last subframe in the series that includes the guard period.

Before proceeding with the disclosure, some definitions are now provided.

A "user equipment" or "UE" is a wireless communication device. Examples of a UE include a mobile phone, a tablet computer, a laptop, and a Machine-to-Machine device.

The term "base station" as used herein refers to hardware and software that operates as part of the infrastructure of a network. Examples include an Evolved Universal Terrestrial Radio Access ("E-UTRA") base station, a transmission point, a Remote Radio Head, an evolved Node B (eNB), a Home eNB, a relay node, an Institute of Electrical and Electronics Engineers ("IEEE") 802.11 Access Point, and an IEEE 802.16 base station. A base station typically controls a cell.

A base station can include multiple network entities. For example, two base stations may operate in conjunction with one another to operate as a single base station. A base station may also mean a sub-portion of another base station. For example, a base station may control multiple cells, each of which is controlled by certain resources of the base station. Each set of resources (e.g., each antenna array along with the equipment that controls it) may constitute a separate base station.

The term "cell" may refer to the geographical area covered by a base station or may refer to the base station itself. The context in which the term is used indicates its meaning. For example, when a UE is said to be transmitting to a cell, it should be understood to mean that the UE is transmitting to the base station that controls the cell. When a UE is said to be in a cell, for example, the term "cell" refers to the geographical area. In the geographical sense, a sector is a type of cell.

Referring to FIG. 1, an example of a wireless communication network in which embodiments may be used is now described. The network 100 is configured to use one or more Radio Access Technologies, examples of which include an E-UTRA, IEEE 802.11, and IEEE 802.16. The network 100 includes a base station 102.

In some embodiments, two or more cells are controlled by a single base station or by multiple network entities that coordinate with one another, e.g., when Carrier Aggregation ("CA") or Coordinated Multipoint communication is being used.

The base station and the UEs of FIG. 1 are only representative and are intended to facilitate description. In fact, the network 100 may have many cells and network entities and be in communication with many UEs. For example, if the network 100 is a Long-Term Evolution ("LTE") network, then there are likely many network entities controlling many macrocells. Additionally, many users will be moving within and between the macrocells.

Referring still to FIG. 1, the network 100 also includes a backhaul network 104. The backhaul network 104 includes wired and wireless infrastructure elements that carry signals around various parts of the network 100 and among the cells. Examples of infrastructure elements include fiber optic lines and wireless microwave links. The network 100 also includes a core network 106 that controls the operation of the network 100 using various resources including billing systems, home-location registers, and Internet gateways. In an LTE implementation, resources of the core network 106 communicate with network entities and with other networks over the Evolved Universal Mobile Telecommunication System Terrestrial Radio Access Network.

Also shown in FIG. 1 are UE1, UE2, and UE3. Each of the UEs is capable of communicating with the network 100 via the base station 102 (or other base station), either in an active mode or in an idle mode. The base station 102 can transmit signals to, and receive signals from, UE1, UE2, and UE3.

In an embodiment of the invention, the UEs of FIG. 1 are capable of D2D communication. The base station 102 sets up D2D communication between UEs by allocating the appropriate time-frequency resources to the UEs and ordering or permitting the UEs to communicate directly with one another using the allocated time-frequency resources. The time-frequency resources allocated to the UEs may be uplink ("UL") resources such as UL Resource Blocks ("RBs") or downlink ("DL") resources (e.g., DL RBs). For example, the base station 102 may allocate one or more resource blocks of a UL subframe or a DL subframe to the UEs. The base station 102 can control other aspects of the D2D communication, such as how the UEs discover one another and how much interference they cause to other UEs in the network 100.

D2D-allocated UL or DL RBs may occur periodically, such as in every frame or in every subframe. Using these allocated RBs, two or more UEs of FIG. 1 establish a data stream, which, for example, is structured as a series of time-duplexed subframes or slots, in which each subframe or slot uses one or more RB of the UL or the DL carriers. In one embodiment, the RBs used by the UEs are taken from the UL subframes. These RBs are preferably selected from the "PUCCH" region (i.e., the set of RBs that are primarily used for the Physical Uplink Control CHannel) of the UL carrier. In this configuration, a UE would need to have the capability to transmit to the base station 102 in one subframe and to a D2D peer in the next subframe.

The UE's use of the UL resources does not preclude the simultaneous use of those resources by the base station 102. For example, the UEs engaged in D2D communication may be close, needing only a weak signal to communicate with one another. Consequently, the D2D signals may be too low to interfere with the base station's reception of signals from other UEs on those resources.

Figure 2:
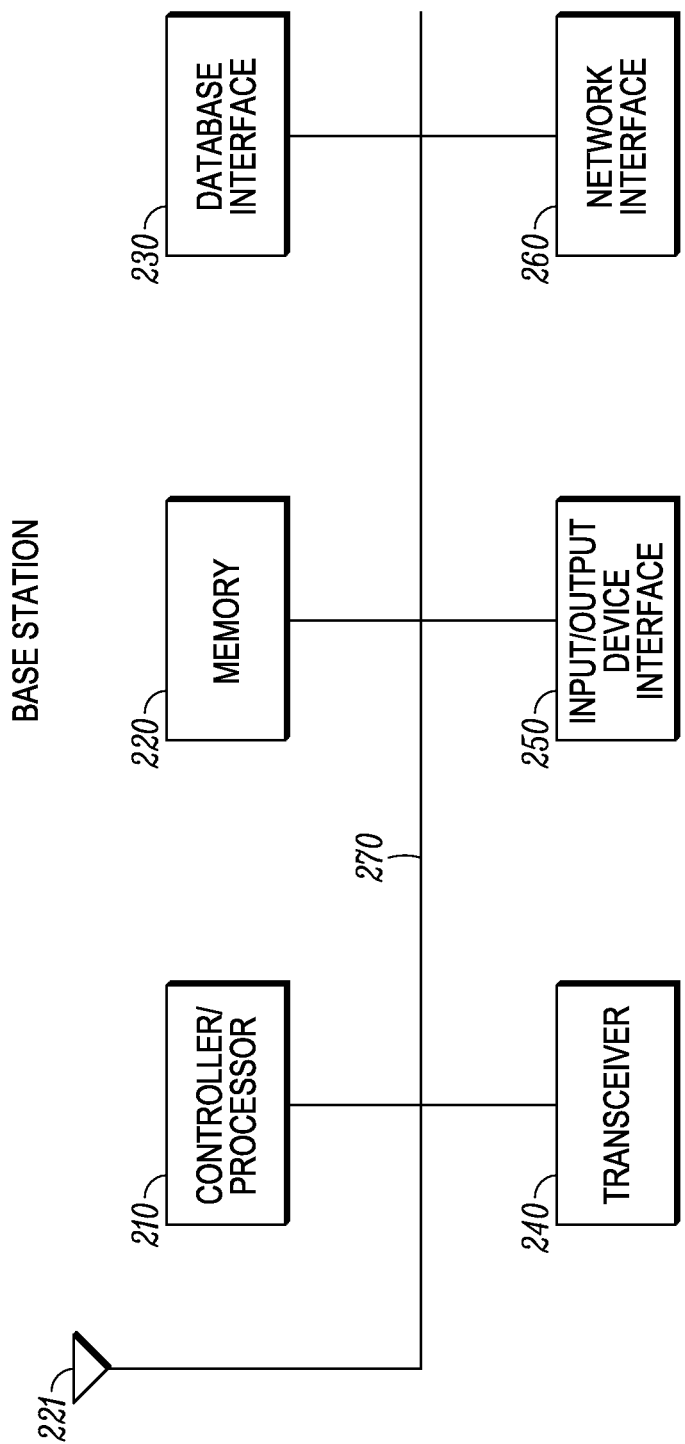
FIG. 2 shows a representative base station.

FIG. 2 illustrates a configuration of the base station 102 (from FIG. 1) in accordance with an embodiment. The base station 102 includes a controller/processor 210, a memory 220, a database interface 230, a transceiver 240, input/output (I/O) device interface 250, a network interface 260, and one more antennas represented by antenna 221. Each of these elements is communicatively linked to one another via one or more data pathways 270. Examples of data pathways include wires, conductive pathways on a microchip, and wireless connections.

During operation of the base station 102, the transceiver 240 receives data from the controller/processor 210 and transmits radio-frequency ("RF") signals representing the data via the antenna 221. Similarly, the transceiver 240 receives RF signals via the antenna 221, converts the signals into appropriately formatted data, and provides the data to the controller/processor 210. The controller/processor 210 retrieves instructions from the memory 220 and, based on those instructions, provides outgoing data to the transceiver 240 or receives incoming data from the transceiver 240. If needed, the controller/processor 210 can retrieve data from a database via the database interface 230.

Referring still to FIG. 2, the controller/processor 210 transmits data to other network entities of the network 100 (FIG. 1) via the network interface 260, which is coupled to the backhaul network 104. The controller/processor 210 also receives data from and sends data to an external device, such as an external drive, via the I/O interface 250.

The controller/processor 210 is any programmable device such as a computer, a microprocessor, a microcontroller, a set of peripheral integrated circuit elements, an integrated circuit (e.g., an application-specific integrated circuit), hardware/electronic logic circuits (e.g., a discrete element circuit), a programmable logic device (e.g., a programmable logic array), or a field programmable gate-array.

Possible implementations of the memory 220 include volatile memory, non-volatile memory, electrical, magnetic optical memory, random-access memory, cache, and hard disc. The controller/processor 210 uses the database interface 230 to access a database. The database may contain formatting data that allow a UE to connect to the network 100 (FIG. 1).

The I/O device interface 250 is connected to one or more input devices such as a keyboard, mouse, pen-operated touch screen, or voice-recognition device. The I/O device interface 250 is also connected to one or more output devices, such as a monitor, printer, disc drive, or speaker. The I/O device interface 250 may receive a data task or connection criteria from a network administrator.

The network connection interface 260 is connected to one or more devices capable of transmitting and receiving signals from the network 100. Examples of such devices include a modem, a network interface card, and a transceiver. One use for the network connection interface 260 is to connect a client device to the network 100.

According to an embodiment, the antenna 221 is one of a set of geographically collocated or proximal physical antenna elements linked to the one or more data paths 270, each antenna 221 having one or more transmitters and one or more receivers. The number of transmitters that the base station 102 has is related to the number of transmit antennas at the base station 102. The base station 102 may use the multiple antennas to support Multiple-Input Multiple-Output ("MIMO") communication.

Figure 3:
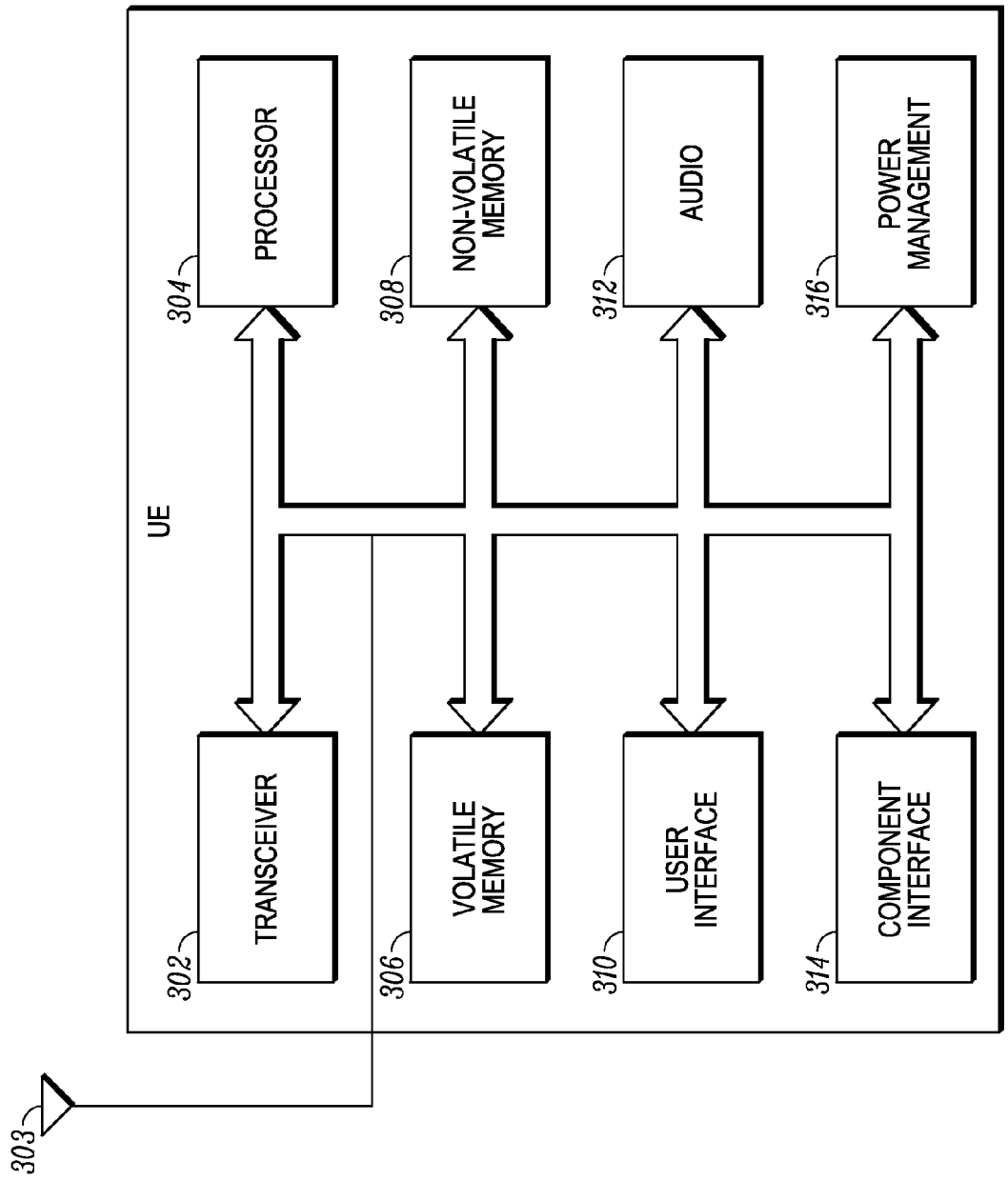
FIG. 3 shows a representative user equipment ("UE")

FIG. 3 is a block diagram of a UE (such as one or more of the UEs depicted in FIG. 1) according to an embodiment. The UE includes a transceiver 302, which is capable of sending and receiving data over the network 100. The transceiver 302 is linked to one or more antennas, represented by the antenna 303. The antenna 303 may be configured like antennas of the base station 102 of FIG. 2. The UE may support MIMO.

The UE also includes a processor 304 that executes programs. The UE also includes a volatile memory 306 and a non-volatile memory 308 that store the programs. The UE includes a user input interface 310 that has elements such as a keypad, display, and touch screen. The UE also includes an audio interface 312 that has elements such as a microphone, earphone, and speaker. The UE also includes a component interface 314 to which additional elements, such as a universal serial bus interface, may be attached. Finally, the UE includes a power-management module 316. The power-management module 316, under the control of the processor 304, controls the amount of power used by the transceiver 302 to transmit signals.

The transceiver 302 receives data from the processor 304 and transmits RF signals representing the data via the antenna 303. Similarly, the transceiver 302 receives RF signals via the antenna 303, converts the signals into appropriately formatted data, and provides the data to the processor 304. The processor 304 retrieves instructions from the non-volatile memory 308 and, based on those instructions, provides outgoing data to, or receives incoming data from, the transceiver 302. If needed, the processor 304 can write to, or read from, the volatile memory 306, particularly for caching data and instructions that the processor 304 requires in order for it to perform its functions.

The user interface 310 includes a display screen, such as a touch-sensitive display, that displays the output of various application programs. The user interface 310 additionally includes on-screen buttons that the user can press in order to cause the UE to respond. The content shown on the user interface 310 is generally provided to the user interface at the direction of the processor 304. Similarly, information received through the user interface 310 is provided to the processor 304. The processor 304 may use the information to execute a program that causes the UE to carry out a function whose effects may not be apparent to a user.

In an LTE embodiment, the multiplexing or multiple-access scheme used for communication between the base station 102 (FIG. 1) and the UEs differs depending on whether the signals are being sent in the UL direction (traveling from a UE to a base station) or in the DL direction (traveling from a base station to a UE). The multiple-access scheme used in the DL direction is a multiple-access version of Orthogonal Frequency-Division Multiplexing ("OFDM") called Orthogonal Frequency-Division Multiple Access. In the UL direction, Single Carrier Frequency-Division Multiple Access ("SC-FDMA") or Discrete Fourier Transform Spread OFDM ("DFT-SOFDM") is typically used. In an LTE implementation, the aggregated channel bandwidth of the UL or DL carriers varies depending upon whether CA is being used (e.g., up to 20 MHz without CA or up to 100 MHz with CA).

Figure 4A:
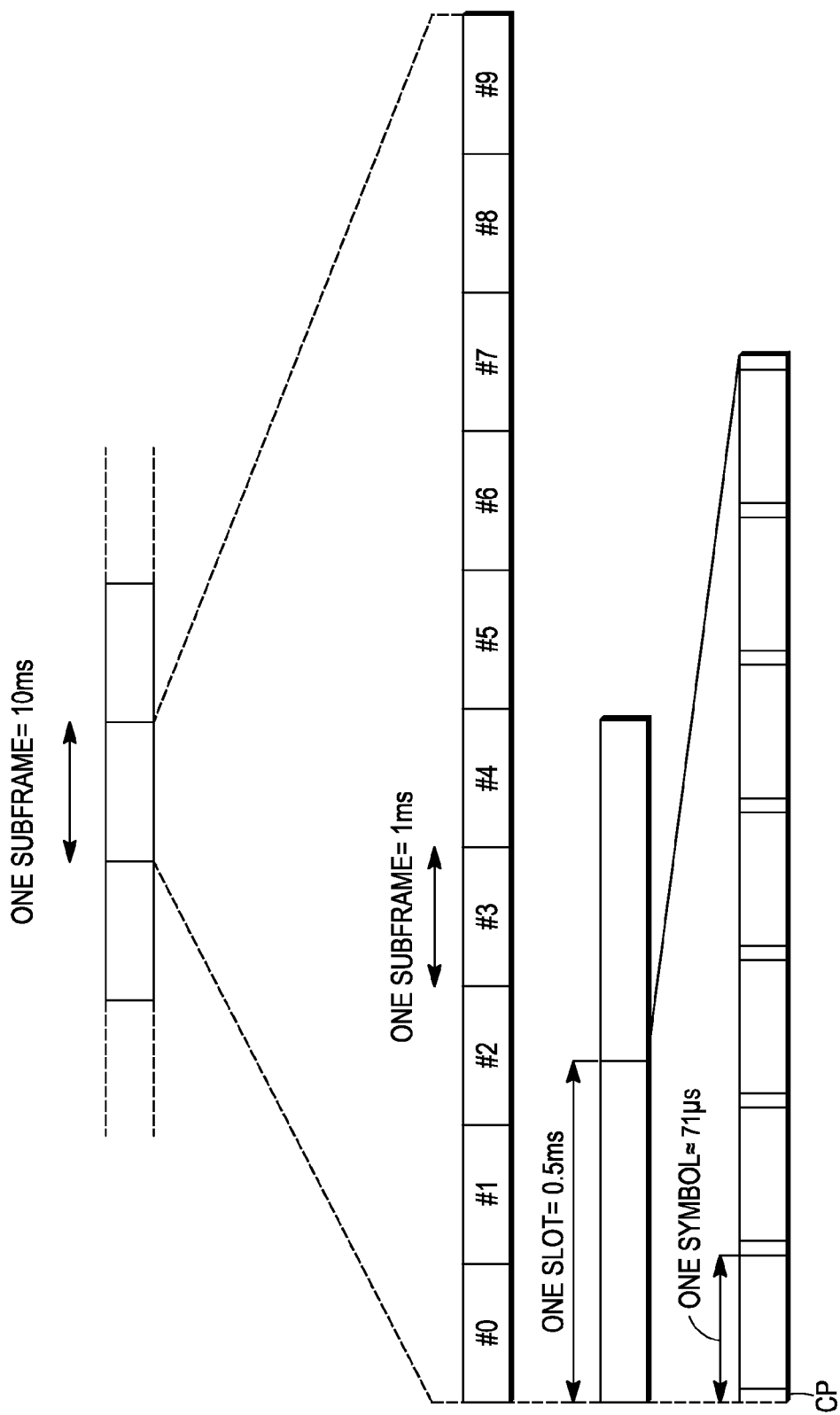
FIG. 4A is a frame structure.

Referring to FIG. 4A, an LTE frame structure used for carrying data between the UEs and the network entities on both UL carriers and DL carriers according to an embodiment is now described. In LTE operation, uplink and downlink radio frames are each 10 milliseconds (10 ms) long and are divided into ten subframes, each of 1 ms duration. Each subframe is divided into two slots of 0.5 ms each. Each slot contains a number of OFDM symbols, and each OFDM symbol may have a Cyclic Prefix ("CP"). The duration of a CP varies according to the format chosen (normal or extended CP), but is about 4.7 microseconds in the example of FIG. 4A, with the entire symbol being about 71 microseconds. An extended prefix for an OFDM symbol in an LTE system is 16.7 microseconds (for 15 kHz subcarriers) or 33.3 microseconds (for 7.5 kHz sub carriers).

Figure 4B:
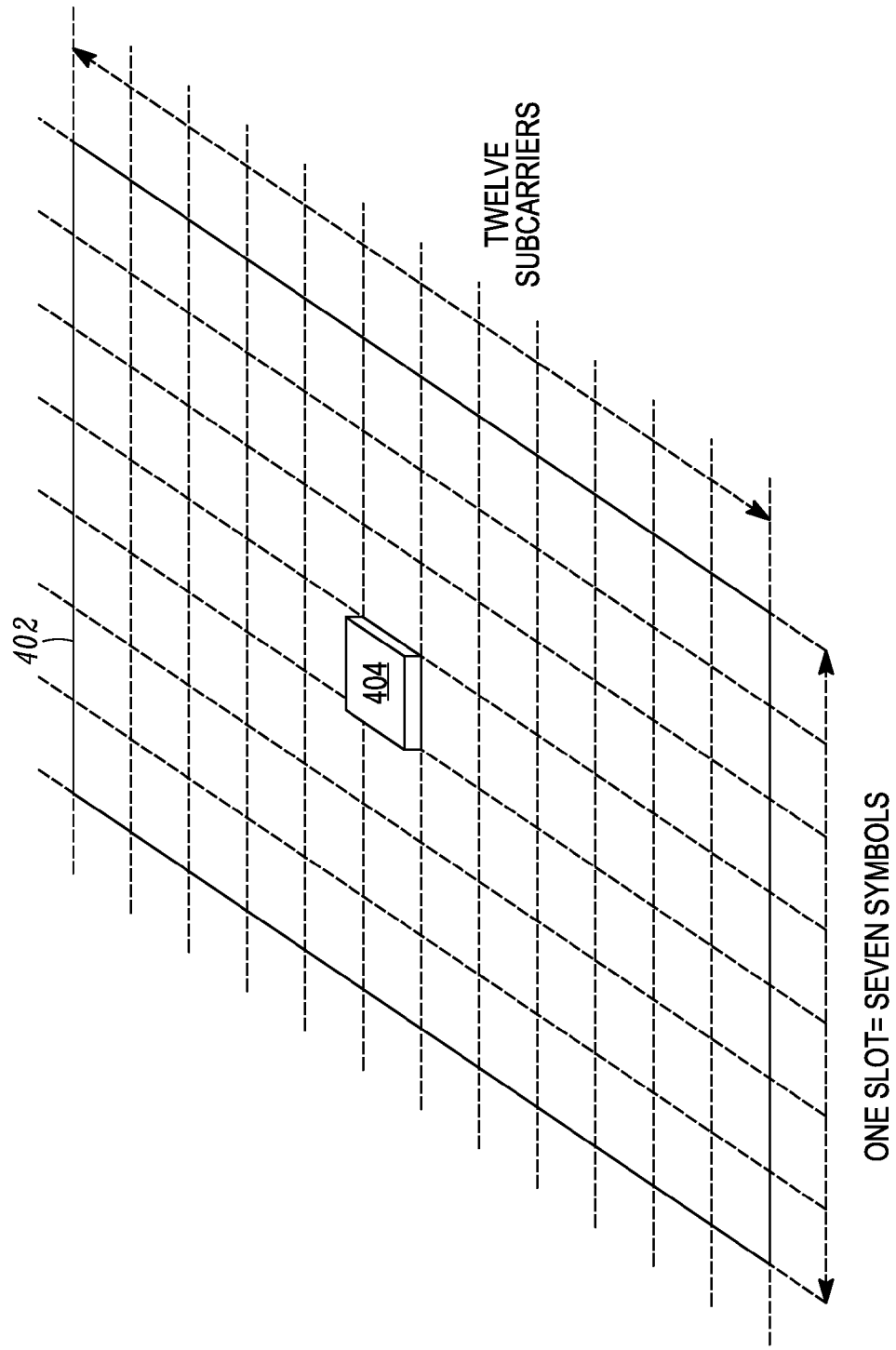
FIG. 4B is a resource block.

In the context of time-frequency, the subframe is divided into units of RBs, as shown in FIG. 4B. When a normal CP is used, each RB 402 is 12 subcarriers by 7 symbols (one slot). Each RB (when a normal CP is used), in turn, is composed of 84 Resource Elements ("REs") 404. Each RE is 1 subcarrier by 1 symbol. However, RBs and REs may be other sizes in other embodiments. For example, when an extended CP is used, each RB is 12 subcarriers by 6 symbols, for a total of 72 REs per RB. Thus, the terms RE and RB may include time-frequency resources of any size. In LTE, an RB or an RB pair (RBs in both slots of a subframe) is the typical unit to which resource allocations may be assigned for uplink and downlink communications.

The UEs receive downlink control information ("DCI") in a control region (one of a Physical Downlink Control CHannel ("PDCCH") or an Enhanced PDCCH]). There are various types of DCI Formats for carrying a variety of control information. For example, the DCI Format 0 is used to schedule uplink transmissions and typically comprises scheduling information fields such as a modulation and coding scheme ("MCS") index, Resource block allocation, Hopping flag, New Data Indicator, Transmit power control command, or hybrid Automatic Repeat-reQuest ("ARQ") information. The user identification or user ID is typically embedded within the Cyclic Redundancy Check ("CRC") bits. The DCI Format 1A is a compact scheduling grant used to schedule a single transport block and includes fields similar to those in DCI Format 0 and additional fields such as Redundancy Version. DCI Format 2A is used to schedule two transport blocks in the downlink using open-loop MIMO, whereas DCI Format 2B is used to schedule two transport blocks in the DL using closed-loop MIMO and Cell-specific Reference Signal ("CRS"). DCI Format 2C is used for scheduling DL transmissions in transmission mode 9, where the up to two transport blocks may be scheduled using the Demodulation Reference Signal ("DM-RS"). For each DCI format, a CRC is attached, and a user id or a Radio Network Temporary Identifier is embedded into the CRC-attached DCI format, which is then encoded using a convolutional encoder and the resulting stream is rate-matched and prepared for transmission.

Figure 5:
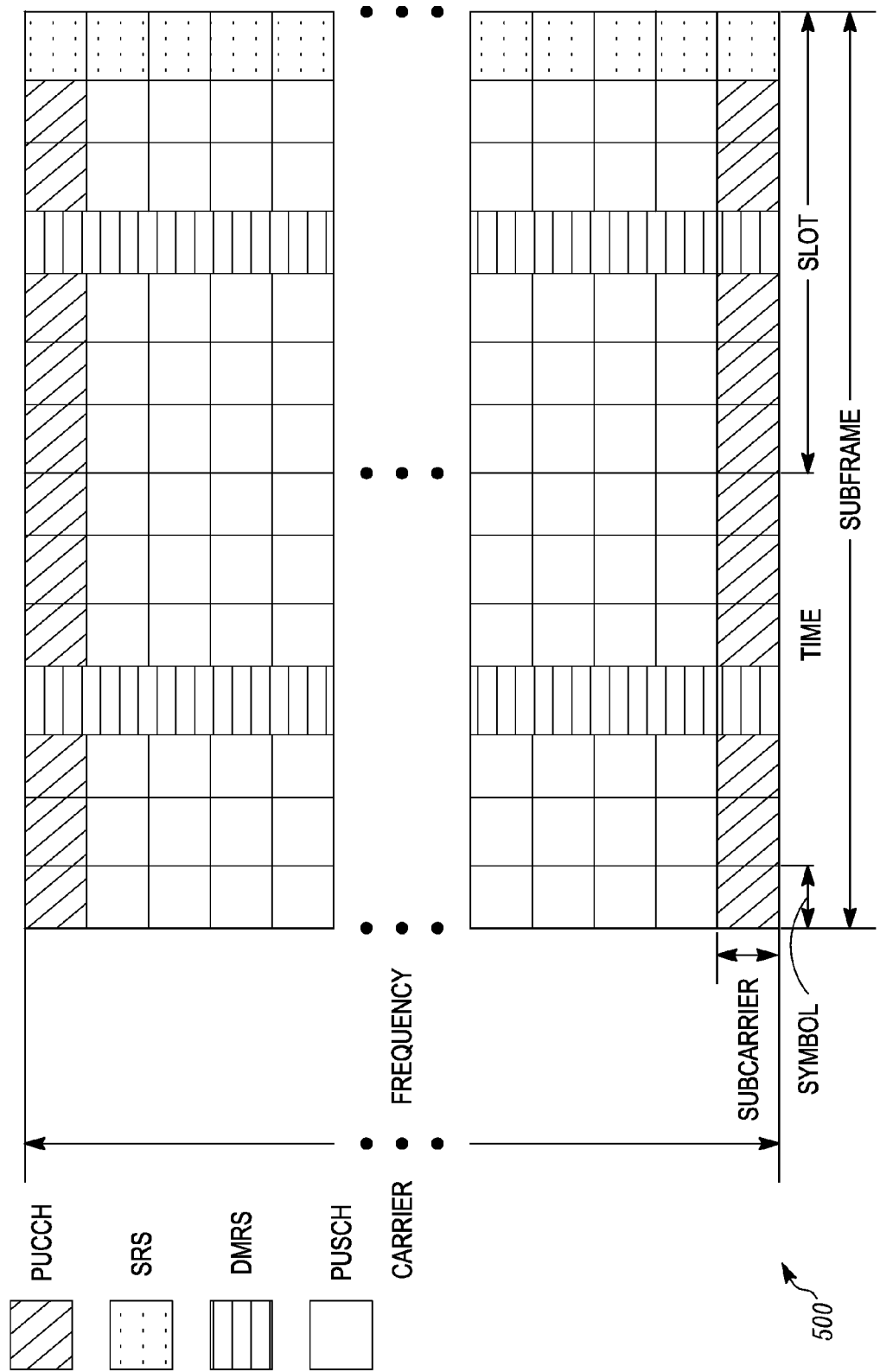
FIG. 5 is an uplink subframe.

Referring to FIG. 5, a UL subframe structure used to carry data from UEs to network entities over a UL carrier according to an LTE embodiment is now described.

In this embodiment, a UE transmits data and certain types of control information to the base station 102 on a Physical Uplink Shared CHannel ("PUSCH"). The UE transmits control information to the base station 102 on a PUCCH. Data carried by the PUSCH includes user data such as video data (e.g., streaming video) or audio data (e.g., voice calls). A UE may also transmit control information on the PUSCH, such as Hybrid Automatic Repeat Request Acknowledgement ("HARQ-ACK") feedback and Channel State Information ("CSI") reports.

Each CSI report sent by a UE includes one or more of a Channel Quality Indicator ("CQI"), a Precoding Matrix Indicator ("PMI"), a Precoder Type Indication ("PTI"), and a Rank Indicator ("RI"). The UE uses the CQI to indicate the highest MCS that, if used, would result in DL transmissions having a BLock Error Rate of no more than, for example, 10%. The UE uses the PMI to indicate, to the base station, a recommended precoder matrix for the DL transmissions. The RI is used by the UE to recommend the transmission rank (number of transmission layers) that should preferably be used for DL transmission to the UE. The PTI distinguishes slow fading environments from fast fading environments.

The control information transmitted by a UE on the PUCCH includes HARQ-ACK feedback, Scheduling Requests ("SRs"), and CSI reports. The UE sends HARQ-ACK feedback in order to acknowledge or to negatively acknowledge data that the UE receives from a base station. An SR is used by the UE to request UL resources from the network 100, including from one or more network entities. CSI reports are used by a UE to report, to a base station, information regarding the DL transmission channel as seen from the point of view of the UE.

A UE may transmit a UL DM-RS or a Sounding Reference Signal ("SRS") during communication with the network. The UL DM-RS is used by a base station for channel estimation to enable coherent demodulation of the PUSCH or PUCCH. The SRS is used by the base station for channel state estimation to support, for example, uplink channel-dependent scheduling and link adaptation.

In an embodiment, there are different PUCCH formats, but regardless of format, a PUCCH generally carries control information from the UEs to the network entities. PUCCH resource blocks are typically located at the edges of the UL carrier, while the RBs in between may be used for PUSCH resource assignment. In various embodiments described herein, a base station allocates resources of a PUCCH or a PUSCH to carry data from UE to UE in D2D communication.

Figure 6:
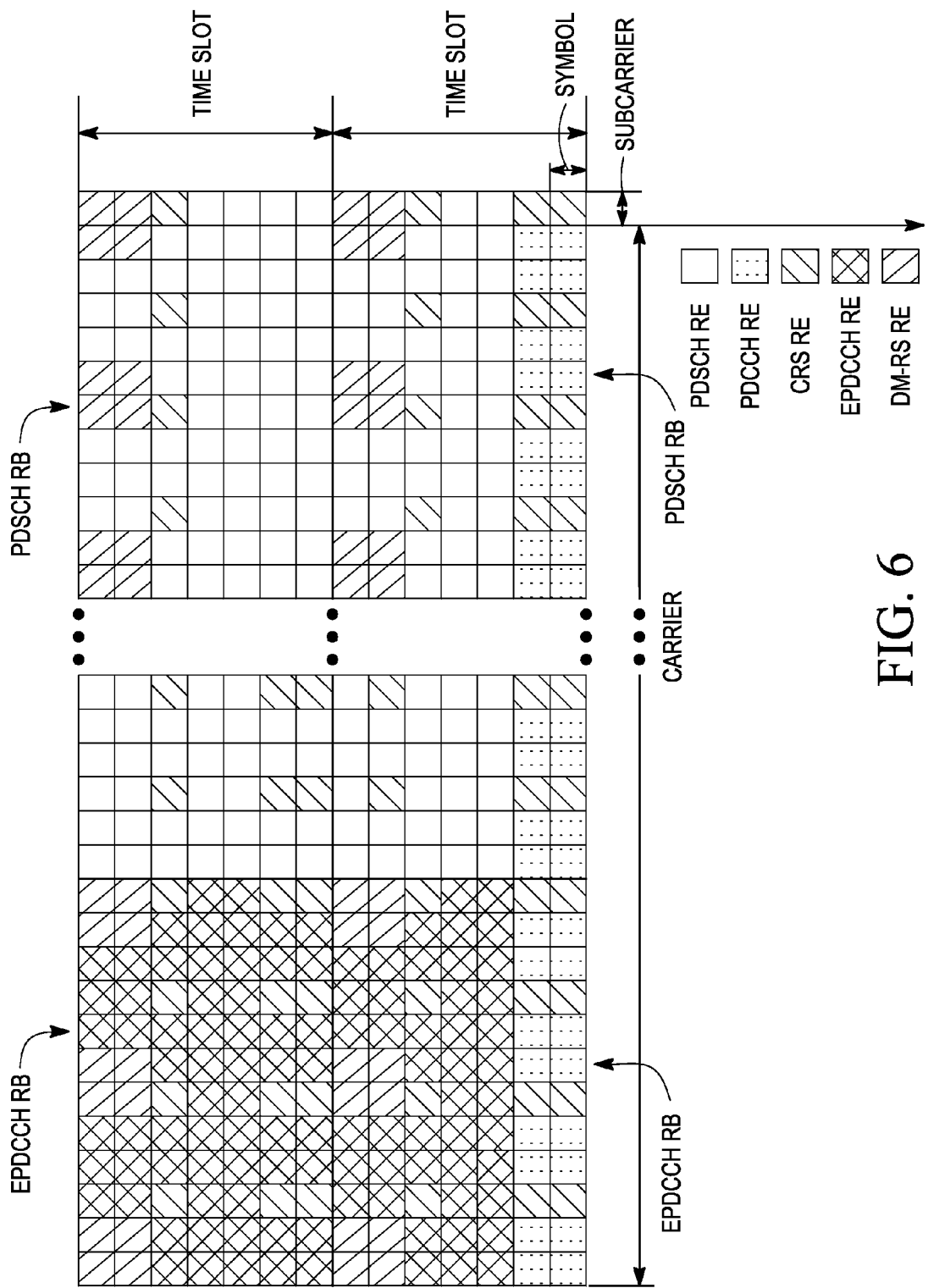
FIG. 6 is a downlink subframe.

Referring to FIG. 6, a structure of a DL subframe used for carrying data from the base station 102 to a UE on a DL carrier is now described. The frequency axis is divided into subcarriers. The time axis is divided into symbols. The subframe is divided into RBs.

A base station transmits several types of reference signals on the DL subframe. One such reference signal is a Channel State Information Reference Signal ("CSI-RS"), which is used by the UE to determine CSI. The base station provides the CSI-RS configuration to the UE via Radio Resource Control ("RRC") signaling. The RRC layer in the UE provides the CSI-RS configuration information to the physical layer in the UE (e.g., "higher layer signaling"). The UE reports CSI to the base station. The CSI-RS is not necessarily transmitted in all subframes.

Referring again to FIG. 6, other reference signals on the DL subframe include a DM-RS with the REs being referred to as DM-RS REs. Typically, reference signals corresponding to antenna ports 7 and 8 are multiplexed using Code Division Multiplexing or another scheme and are mapped to the same REs in time and frequency domain. The subframe can also include other reference signals such as CRS, positioning reference signal, primary synchronization signal, and secondary synchronization signal that are distributed in the control regions or user data regions of the sub-frame.

As previously noted, a UE, in an embodiment, requests uplink resources from the network 100 (FIG. 1) by transmitting an SR to the base station 102. Referring to FIG. 6, if the base station grants the request, it responds by sending a scheduling grant to the UE. A scheduling grant is part of the DCI. The base station 102 transmits the DCI on the PDCCH. The scheduling grant provides the UE with parameters that the UE uses to transmit data on the PUSCH. These parameters include a data MCS, the transport block size, a resource allocation, hopping parameters, power control information, and other control information. Examples of resources that can be allocated include resource blocks and bandwidth (transmission bandwidth) within the transmission bandwidth configuration.

Although the various embodiments are frequently described in the context of an LTE cellular system, it is to be understood that the scope is not limited to LTE and may be implemented in other types of wireless networks (IEEE 802.11, 802.16, etc.).

Figure 8A:
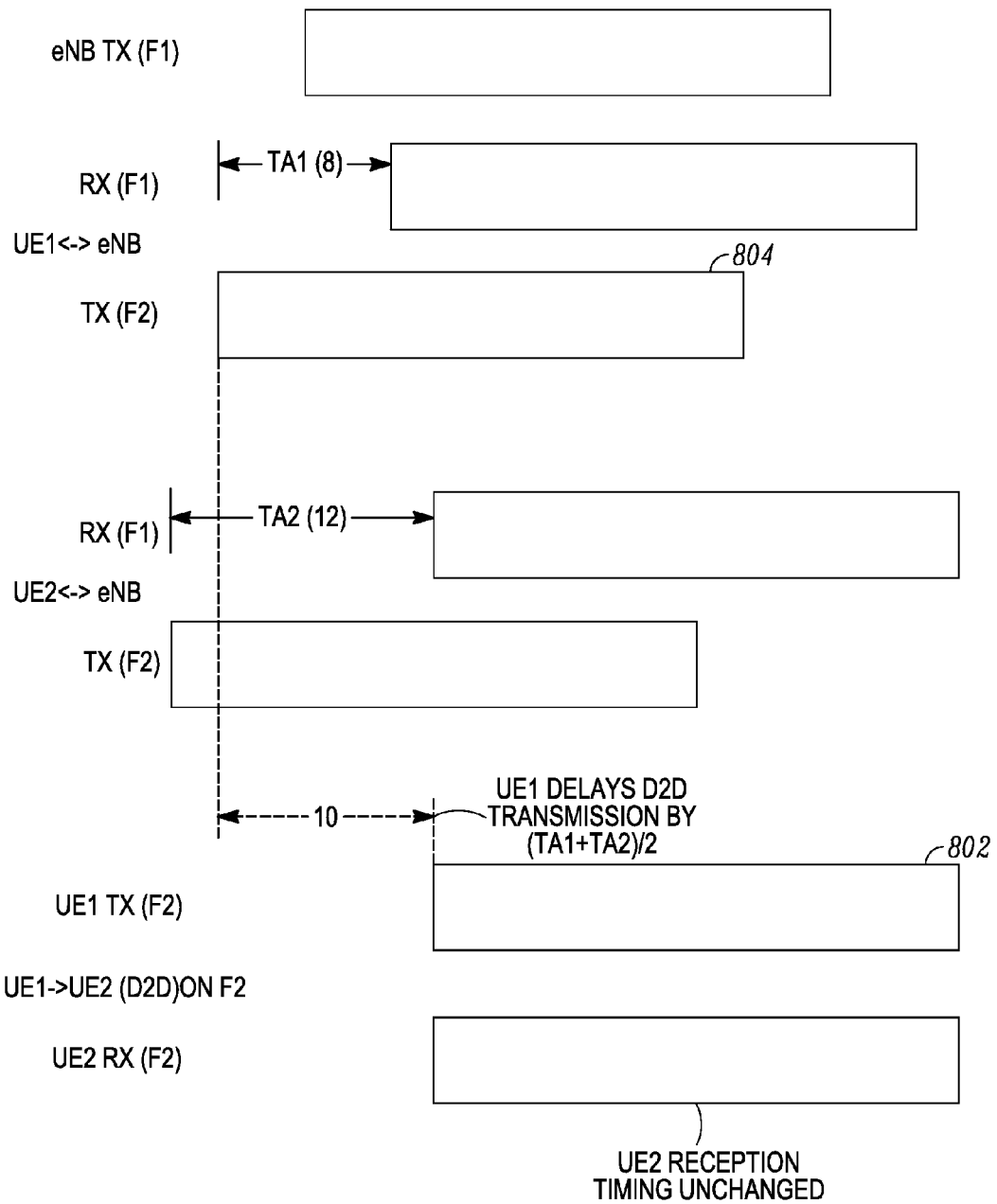
FIG. 8A illustrates a scenario in which the UEs are close to one another, and UE1 delays its D2D transmissions.

Turning to FIG. 8A, a first set of embodiments are now described. In some of these embodiments, it is assumed that the UEs engaging in D2D communication are close to one another, such that the propagation delay between the transmitting D2D UE and receiving D2D UE is negligible or relatively small (e.g., less than 250 ns). It is also assumed that TA1 is the TA value for UE1 and TA2 is the TA value for UE2.

In this set of embodiments, the communication scheme is (1) time-division duplex or (2) frequency-division duplex ("FDD") with the following conditions: Either or both UE1 and UE2 use a single receiver for receiving DL signals (on frequency F1) and for receiving D2D signals (on frequency F2).

Initially, the base station provides UE1 with the TA value assigned to UE2 (TA2) and provides UE2 with the TA value assigned to UE1 (TA1).

UE2, the receiving D2D UE, needs to retune its receiver when switching from DL reception to D2D reception, primarily for FDD. To compensate for timing differences between UE1 and UE2, UE1 (the transmitting D2D UE) delays its D2D transmission 802 to UE2 (relative to the normal transmission time for its uplink transmission 804 (e.g., PUSCH, PUCCH, SRS) to the base station) by $$\frac{TA1 + TA2}{2}.$$

This has the effect of reducing the length of the subframe by a duration of $$\frac{TA1 + TA2}{2}.$$

Alternatively, in the case of consecutive D2D subframes, the length of the last subframe may be reduced. Additional reduction in subframe length may be needed to account for receiver retuning time and possible communication with the base station in the next subframe.

TA1/2 represents the propagation delay between UE1 and the base station, and TA2/2 represents the propagation delay between UE2 and the base station. In other words, the transmitting D2D UE delays its transmit time relative to its UL transmit time to allow the receiving D2D UE to complete reception of the previous DL subframe (on F1) from the base station and to begin the D2D reception (on F2). The duration of UE1's delay is:

$$\max\left(0, \frac{TA_{Tx} + TA_{Rx}}{2} - T_{Prop,D2D}\right) \quad (1)$$

where $TA_{Tx}$ is the TA value for the transmitting D2D UE, $TA_{Rx}$ is the TA value for the receiving D2D UE used for communicating with the base station, and $T_{Prop,D2D}$ is the propagation delay for the D2D link. For the case in which D2D UEs are close to each other, $T_{Prop,D2D} \approx 0$ can be assumed. The delay in transmit time in Equation (1) can result in a reduction in the length of the first D2D subframe.

Alternatively, the base station estimates $T_{Prop,D2D}$ based on location information for the D2D UE and signals $T_{Prop,D2D}$ to the UEs.

In another alternative, the UEs may exchange location coordinates via the network and estimate $T_{Prop,D2D}$ based on the location coordinates.

In still another alternative, the UEs themselves determine $T_{Prop,D2D}$ based on the SRS (or other synchronization reference signal) transmissions, as in the Second Set of Embodiments below.

For the single-receiver FDD case, the receiving D2D UE (during the first transition from base station communication to D2D communication) may require a receiver retuning time ($T_{Rx\_switch}$) for switching its receiver from base station DL on F1 to D2D reception on F2. An updated Equation (1) for the delay in D2D transmit time relative to UL transmit time (to base station of $TA_{Tx}$) for the D2D transmitting UE incorporating the receiver retuning time ($T_{Rx\_switch}$) is given by:

$$\max\left(0, \frac{TA_{Tx} + TA_{Rx}}{2} - T_{Prop,D2D} + T_{Rx\_switch}\right) \quad (1a)$$

To allow the D2D UEs to transmit (on F2) to, or receive (on F1) from, the base station at the beginning of the next subframe following completion of D2D communications, the UEs should stop their D2D transmissions on or before:

$$TA_{Tx} + N_{D2D} \cdot T_{subframe} - \max\left(0, \frac{TA_{Rx} + TA_{Tx}}{2} + T_{Prop,D2D}\right) \quad (2)$$

where $N_{D2D}$ is the number of UL consecutive subframes assigned or used for D2D communication. Thus, the last D2D subframe may need to be shortened.

For the case of a separate receiver for D2D reception on F2, a UE may not need a receiver retuning time ($T_{Rx\_switch}$) at the end of a D2D transmission. The UE may, however, need a retuning or switching time if the receiver needs to be retuned to a different frequency (e.g., to a secondary-cell DL) or if limited isolation or coupling exists between the radios, such that large power fluctuations (e.g., turning a radio off) can impact other RF circuits (e.g., synthesizers, voltage-controlled oscillators or phase-locked loops). Examples of how other RF circuits may be impacted include being tuned off frequency momentarily, experiencing an increase in phase noise, and receiving spurious emissions.

For cases (such a single-receiver case) where the receiver-retuning time ($T_{Rx\_switch}$) is needed at the end of the D2D transmissions to switch the D2D receiving UE receiver from D2D reception of F2 to base station DL reception on F1 for the next subframe, Equation (2) (the time by which the D2D communications should stop) is updated to:

$$TA_{Tx} + N_{D2D} \cdot T_{subframe} - \max\left(0, \frac{TA_{Rx} + TA_{Tx}}{2} + T_{Prop,D2D} + T_{Rx\_switch}\right) \quad (2a)$$

For a UE whose architecture supports transmission on UL frequency F2 to the base station (with a timing advance of $TA_{Rx}$ Rx notation related to D2D reception) at the same time its receiver is switching from D2D reception on F2 to base station reception on F1, at least a portion of the retuning time ($T_{Rx\_switch}$) can occur within the timing advance time of $TA_{Rx}$ (i.e., the time separation between the UL and DL subframe timing). This reduces the amount the last D2D subframe needs to be reduced in length. The retuning time ($T_{Rx\_switch}$) in Equation (2a) can thus be defined as (2b) below to take into account the possible overlap of the retuning time with the time separation between the UL and DL subframe timing of $TA_{Rx}$:

$$T_{Rx\_switch} = \max(0, T_{Rx\_switch} - TA_{Rx}) \quad (2b)$$

The reduction in the D2D communication time (from a time duration corresponding to an integer number of subframes) occurs as a result of (1) the delay in transmit time (Equations 1 and 1 a) and (2) to allow the D2D UEs to prepare to transmit (on F2) to or receive (on F1) at the end of the D2D communication (the max part of Equations 2 and 2a, i.e., $$\max\left(0, \frac{TA_{Rx} - TA_{Tx}}{2} + T_{Prop,D2D}\right)$$

of Equation 2 and $$\max\left(0, \frac{TA_{Rx} - TA_{Tx}}{2} + T_{Prop,D2D} + T_{Rx\_switch}\right)$$

of Equation 2a). This D2D communication time reduction can be accounted for separately. For example, the first value indicates the reduction time (e.g., in samples, micro-seconds, or OFDM or SC-FDMA symbols) in the first D2D subframe, and the second value indicates the reduction time in the last D2D subframe. Alternatively, the components of the D2D communication time reduction can be combined and accounted for in one subframe (e.g., the first value indicating the combined reduction in a single D2D subframe).

In one embodiment, the amount of reduction time (e.g., the first value or the second value) is quantized in an integer number of OFDM symbols and is signaled by the base station to the D2D UEs. In one alternative, the transmitting D2D UE delays its transmit time relative to its uplink transmission time (i.e., the time at which the UE is supposed to transmit to the base station on the uplink) based on the duration indicated by the received first value.

The first D2D subframe is shortened by the duration indicated by the first value. The last D2D subframe is shortened by the duration indicated by the second value. The shortening of a subframe can be considered as defining a guard period corresponding to the shortened duration in the subframe. Thus, the first D2D subframe can be considered as including a guard period at the beginning with a duration indicated by the first value. The last D2D subframe can be considered as including a guard period at the end with a duration indicated by the second value.

For a series of D2D communication subframes, the last D2D subframe is different from the first D2D subframe. For a single D2D communication subframe, the last D2D subframe is same as the first D2D subframe. The receiving D2D UE communication reception time for the first D2D subframe is delayed relative to its normal DL reception time from the base station by the receiver retuning time.

In some embodiments, these methods are implemented using one or more of the following techniques: (1) The time budget for receive retuning (i.e., receiver retuning time duration ($T_{Rx\_switch}$) is predetermined and known by the base station and D2D UEs. (2) The signaled reduction is an offset relative to a particular (predetermined) value such as obtained from an assumption on other UEs TA (e.g., same TA value as itself), $T_{Prop,D2D}$ (e.g., 0 us), ($T_{Rx\_switch}$) (e.g., 20 microseconds), and conservative, same-receiver UE architecture (Equation 1a or 2a). (3) The signaled reduction may be quantized in a number of OFDM symbols. For example, the signaled reduction offset may take a value from the set of $\{-1\ 0\ 1\ 2\}$ OFDM symbols which the D2D UEs add to the predetermined reduction value corresponding to the predetermined assumption.

In the case of D2D transmission to a group of UEs (groupcast or broadcast D2D communication or UE-relay communication), one alternative may be to set $TA_{Rx}$ to be the largest TA value of the receiving D2D UEs. In one embodiment, the base station provides the UEs with the largest $TA_{Rx}$ TA value. In an alternate embodiment, the amount of the reduction of D2D communication time is based on the largest $TA_{Rx}$ TA value, and the base station signals the reduction to the D2D UEs.

Figure 8B:
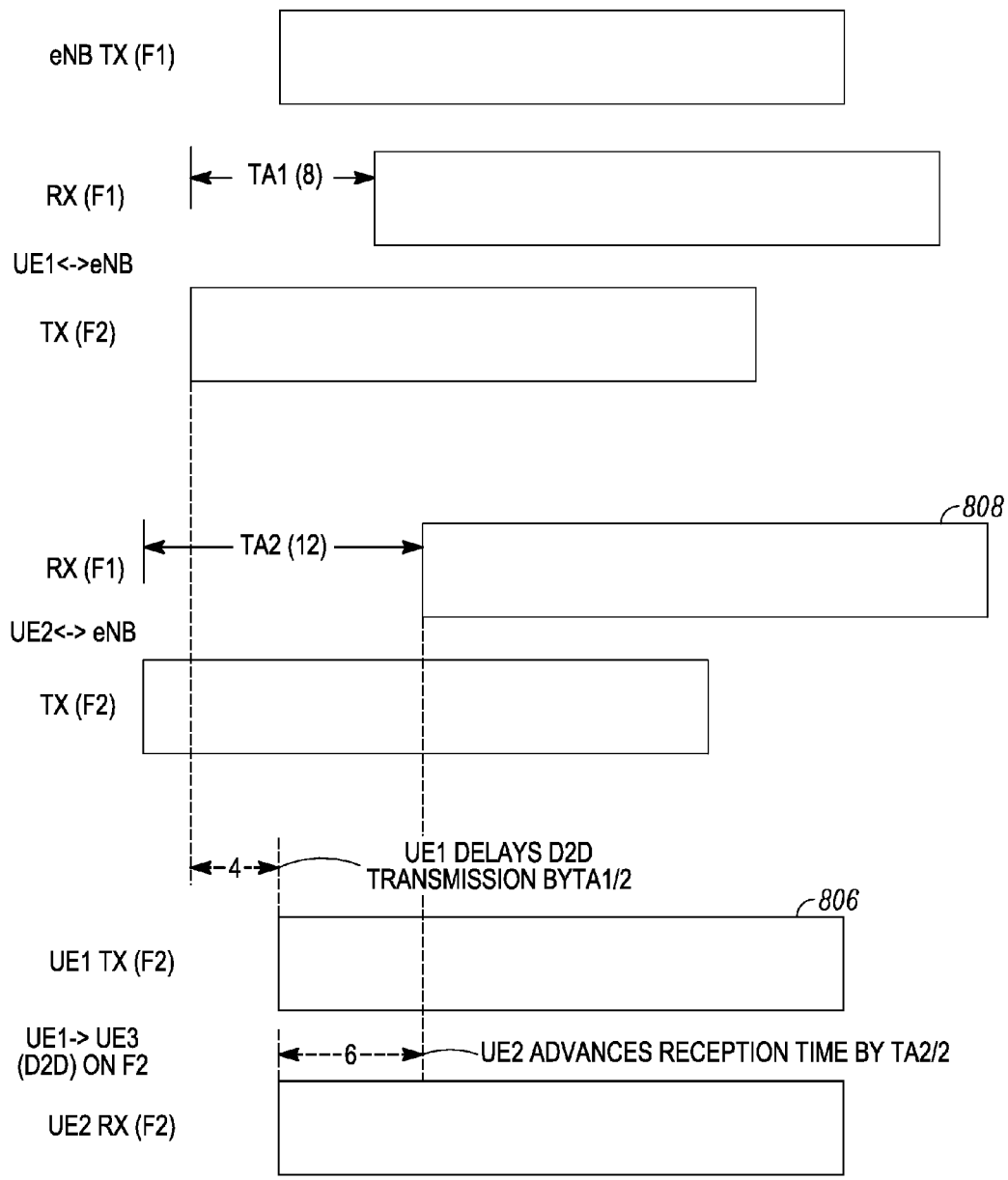
FIG. 8B illustrates a scenario in which the UEs are close to one another, UE1 delays its D2D transmission, and UE2 advances its receive window.

Turning to FIG. 8B, another alternative is for UE1 to delay its D2D transmission 806 by TA1/2 and for UE2 to advance its window for downlink reception 808 by TA2/2.

Another alternative, for the case of a separate receiver for D2D reception (as opposed to retuning from F1 to F2 for D2D reception for FDD and the need for receiver retuning time), is as follows: The transmitting D2D UE delays its transmit time relative to its UL transmit time by:

$$\max\left(0, \frac{TA_{Tx} - TA_{Rx}}{2} - T_{Prop,D2D}\right) \quad (3)$$

D2D transmissions should cease on or before the time specified in Equation (2).

Also, in another embodiment, the base station determines the delay in transmit time and tells the transmitting D2D UE to apply the delay to its D2D transmission.

Figure 9:
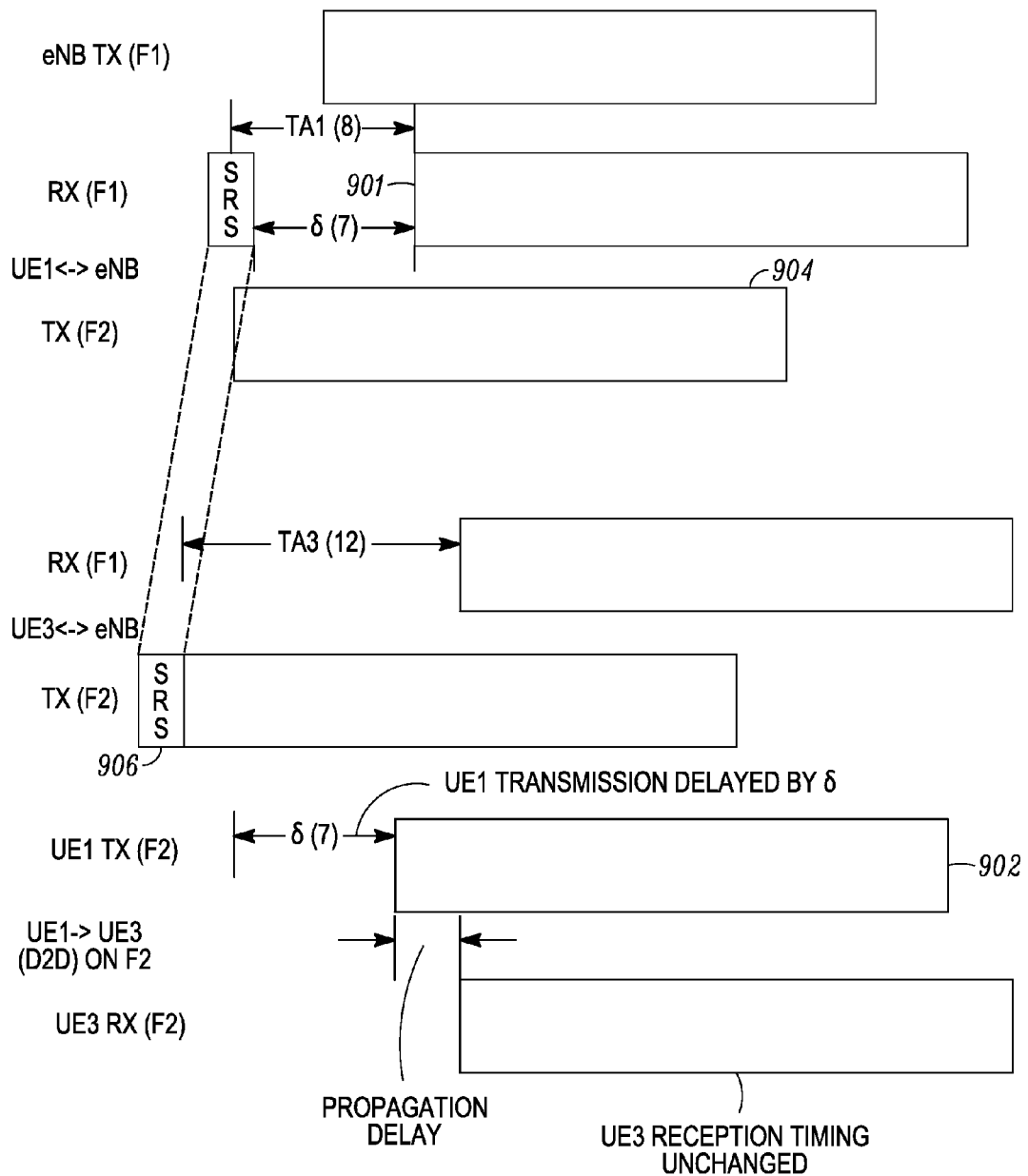
FIG. 9 illustrates a scenario in which the UEs are not close to one another.

Turning to FIG. 9, a second set of embodiments of a D2D timing method are now described. In these embodiments, it is assumed that the UEs engaging in D2D communication are not close to one another. It is further assumed that UE1 is using a TA value TA1 and UE3 is using a TA value TA3.

The network provides UE1 with the SRS configuration of UE3 and vice versa. The SRS configuration can include one or more of the designated subframes and the symbols within the subframes in which the SRS is to be transmitted, the resource elements that are to be used for the SRS transmission, and an SRS sequence. UE1 detects SRS transmission of UE3 and determines the duration ($\delta$) by which SRS reception is earlier than its DL subframe boundary 901—UE1's base station-receive timing.

Furthermore, UE1 delays its D2D transmission 902 to UE3 (relative to the normal time for uplink transmission 904 (e.g., PUSCH, PUCCH, SRS) to the base station) by $\delta$.

As shown in FIG. 9, the SRS transmission 906 by UE3 occurred $$\frac{TA1 + TA3}{2}$$

before the UE1 DL subframe boundary. The propagation delay is therefore $$\frac{TA1 + TA3}{2} - \delta.$$

The delay in transmission needed at UE1 is $$\frac{TA1 + TA3}{2} - \text{propagation delay} = \delta.$$

For both of the above approaches, the assumption is that the TA value assigned is twice the propagation delay in order to ensure that the UL subframe reception at the base station is aligned with the DL subframe transmission. If this is not the case, there would be an offset between the DL subframe transmission and the UL subframe reception. The base station would need to signal this offset to the UEs so that the UEs could make corresponding adjustments.

In a D2D group or groupcast communication or broadcast D2D communication or UE-relay communication, when one of the D2D devices transmits, the other devices in the group listen. According to a third set of embodiments, the receiving devices adjust their timing to that of the transmitting device in order to ensure correct reception.

Figure 10:
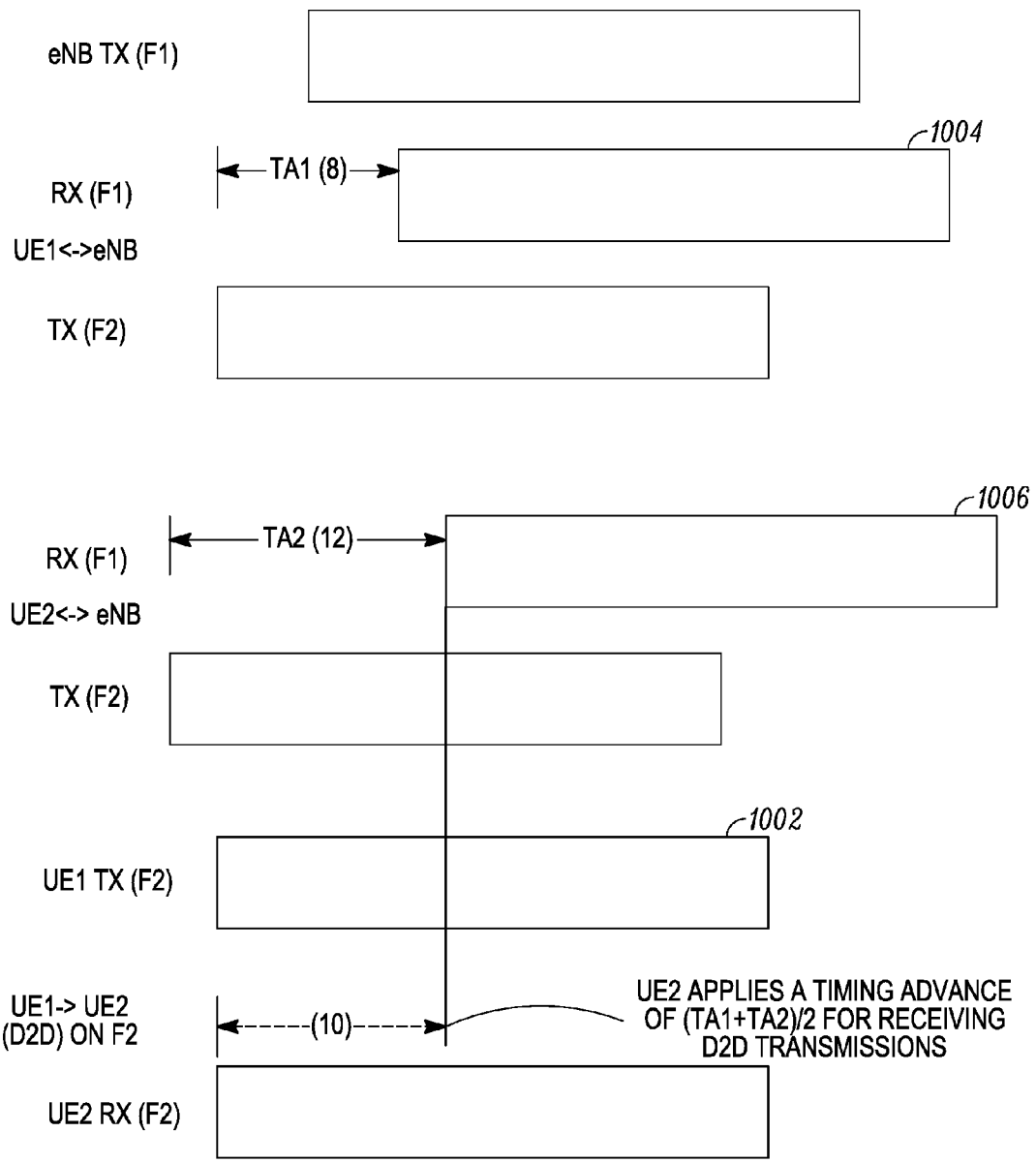
FIGS. 10 and 11 illustrate how embodiments of the disclosure handle groups of D2D UEs.

Turning to FIG. 10, it is assumed that UE1 is using a TA value TA1 and UE2 is using a TA value TA2. It is also assumed that UE1 is provided the TA value assigned to UE2 (TA2), and that UE2 is provided the TA value assigned to UE1

(TA1). Finally, it is assumed that the devices are close to each other, such that there is negligible propagation delay.

Suppose UE2 is configured to perform a D2D transmission 1002 to UE1 (and possibly other UEs in the group). UE1 applies a first timing advance (TA1) to its UL transmissions. UE1 applies a second timing advance of $$\frac{TA1 + TA2}{2}$$

for reception of D2D transmissions (relative to its normal time for DL reception 1004 from the base station). This also shortens the prior DL subframe by duration $$\frac{TA1 + TA2}{2}.$$

Time advancing at the receiving UE may result in the UE being unable to receive some symbols of transmissions from the base station. This can be treated as a (longer) switching gap. Alternatively, if the receiving UE is equipped with an alternate receiver that can be tuned to F2, then interruptions to reception of base-station signals need not occur.

If the D2D devices are not close to one another, then each receiving D2D UE in the group would need to estimate propagation delay from UE1 and apply a timing advance to D2D receptions (relative to its normal reception of DL signals from the base station).

Figure 11:
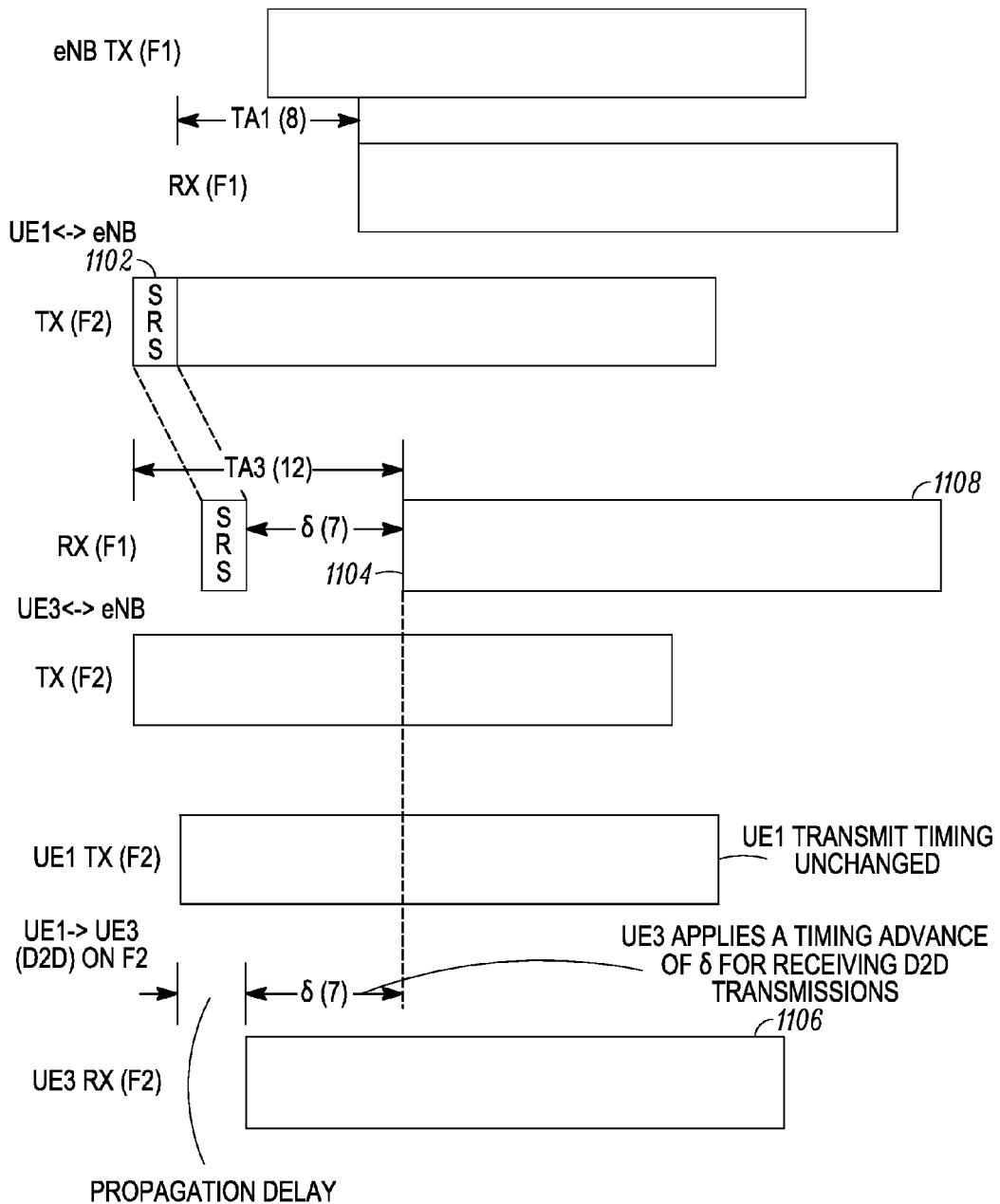

Turning to FIG. 11, it is now assumed that UE1 is using a TA value TA1 and UE3 is using a TA value TA3. It is also assumed that UE1 is provided the SRS configuration of UE3 and vice versa.

Under this set of assumptions, UE3 detects the SRS transmission 1102 of UE1 and determines the duration by which the SRS reception is earlier than its DL subframe boundary (δ) 1104.

UE3 then applies a timing advance of δ for its D2D reception 1106 (relative to its normal time for DL reception 1108). This would also shorten the prior DL subframe by duration δ.

As shown in FIG. 7, the duration by which the start of UE1's normal UL transmission 706 to the base station is ahead of UE2's normal DL reception 704 from the base station is $$\frac{TA1 + TA2}{2}.$$

This duration is referred as the "D2D timing misalignment duration."

Figure 12:
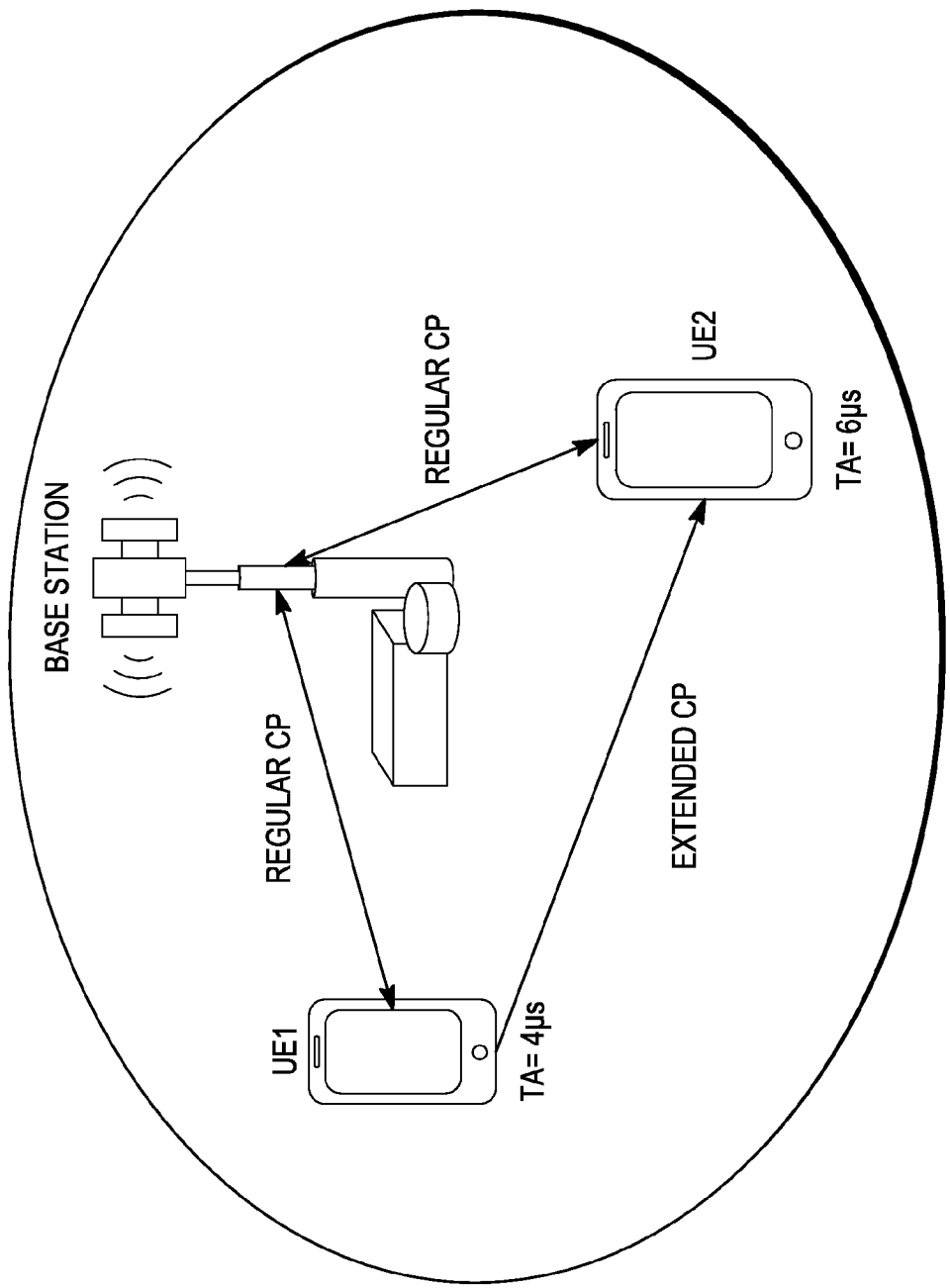
FIGS. 12 and 13 illustrate the use of a longer cyclic prefix for D2D transmissions than for uplink transmissions.
Figure 13:
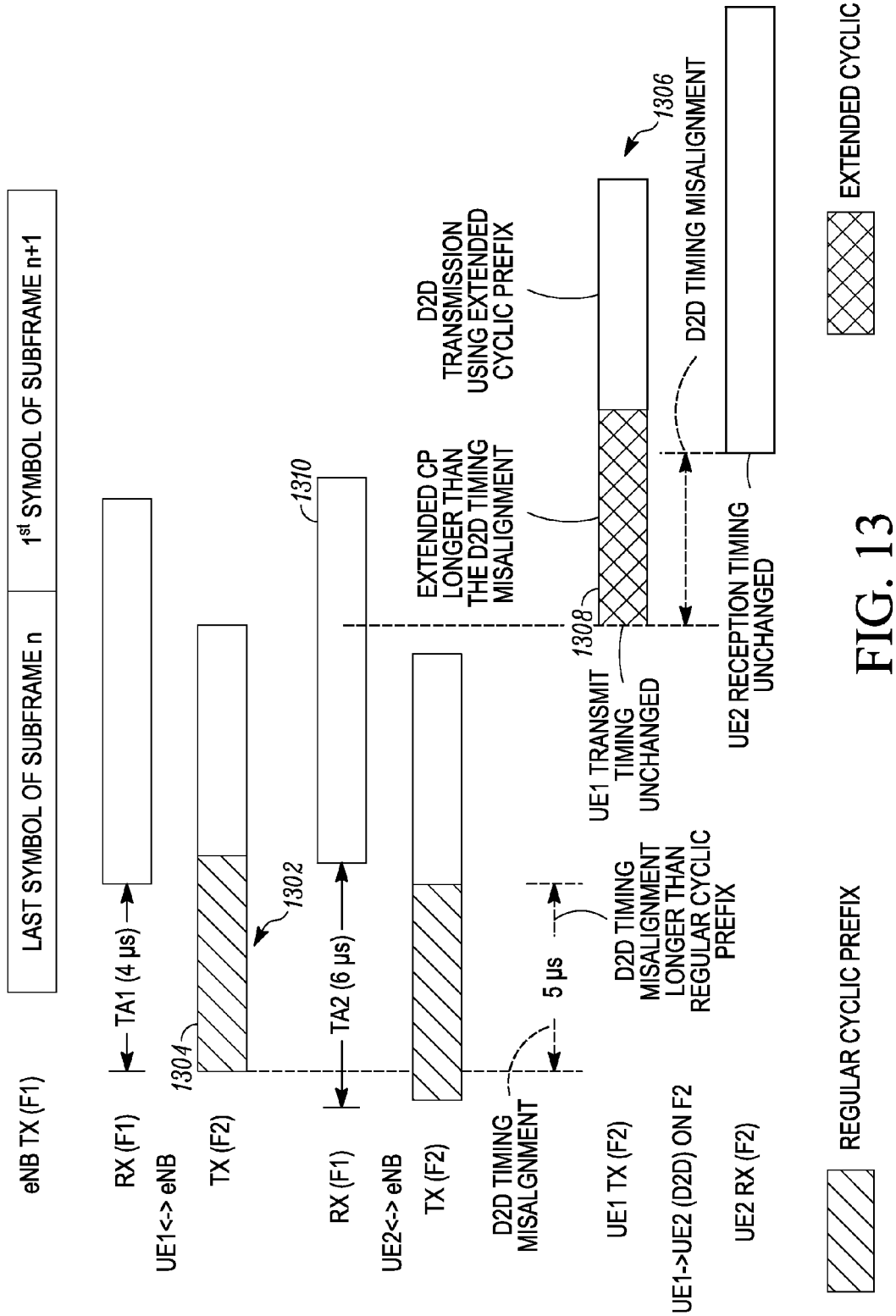

Turning to FIGS. 12 and 13, an embodiment of the disclosure avoids changing timing for D2D transmission and reception (i.e., time-advancing the receiver or time-delaying the transmitter). In this embodiment, the UE1 makes its UL transmission 1302 to the base station using the regular cyclic prefix 1304. When the network allocates to UE1 a resource for D2D transmission to UE2, UE1 performs D2D transmission 1306 using the extended cyclic prefix 1308.

UE2 receives DL signals (DL reception 1310) from the base station using the regular cyclic prefix. When the network allocates a resource for D2D reception from UE1, UE2 receives the D2D transmission 1306 having the extended cyclic prefix 1308.

In LTE the durations of the regular and extended cyclic prefixes are 4.7 μs and 16.7 μs respectively. Switching to extended cyclic prefix ensures that the duration by which UE1's transmission is ahead of UE2's reception $$\left(\text{i.e., } \frac{TA1 + TA2}{2}\right)$$

gets included in the extended cyclic prefix. Given that the extended CP of 16.7 μs corresponds to a range of over 5 km, this may be adequate for supporting even very long range D2D communication. This approach may eliminate the need to apply a separate time-advance or time-delay for D2D communication at the expense of some loss in spectral efficiency due to the use of extended cyclic prefix.

In a related embodiment, UE1 transmits UL to base station using the regular cyclic prefix. The base station determines whether the value of $$\frac{TA1 + TA2}{2}$$

is close to or exceeds the value of the normal cyclic prefix $$\left(\text{e.g., } \frac{TA1 + TA2}{2} > CP - \Delta\right)$$

for some predetermined value of Δ. If it is, then the base station indicates to UE1 and UE2 that they should use extended CP for D2D communication.

For D2D transmission to UE2, UE1 transmits using the extended cyclic prefix if the network has indicated to do so. Otherwise UE1 uses the regular CP. UE2 receives DL from the base station using the regular cyclic prefix.

For D2D reception from UE1, UE2 receives using the extended cyclic prefix if the network has indicated to do so. Otherwise UE2 uses the regular CP.

In some embodiments, a UE uses a DFT-SOFDM- or SC-FDMA-based waveform for transmitting on the D2D link. The transmitting UE uses this waveform with either a normal (regular) cyclic prefix duration or an extended cyclic prefix duration.

For example, considering FIG. 12, UE1 is transmitting to UE2 using D2D communication, and UE1 is also communicating with the base station. When the base station allocates a resource to UE1 for D2D communication, UE1 can transmit to UE2 using a DFT-SOFDM or SC-FDMA waveform. UE1 may use extended CP (as shown in FIG. 12) or use a normal CP (not shown in FIG. 12) while transmitting using the DFT-SOFDM or SC-FDMA waveform. UE2, when assigned by the base station to receive a downlink transmission from the base station, can tune its receiver to receive an OFDM waveform that is conformant with LTE specifications. However, when UE2 is assigned (or configured) by the base station to receive from UE1, it tunes its receiver to receive a DFT-SOFDM or SC-FDMA waveform.

In this example, the complexity of UE2's receiver is increased as the receiver has to support two receiving modes (one for receiving OFDM waveforms from the base station and another for receiving SC-FDMA based waveforms from UE1).

In some implementations, when receiving OFDM transmissions from the base station, UE2's receiver is tuned to an RF frequency, and that RF frequency coincides with the nominal center frequency of one of the received subcarriers from the base station. When receiving SC-FDMA transmissions from UE1, however, the RF center frequency that UE2's receiver is tuned to does not coincide with the nominal center frequency of any of the received subcarriers of UE1. For example, the RF carrier frequency may be a fraction of a subcarrier space (e.g., one half of subcarrier spacing) away from the nominal center frequency of one of the received subcarriers.

In some other embodiments, a UE can utilize an OFDM waveform for transmitting on the D2D link. The transmitting UE may use this waveform with either normal (or regular) cyclic prefix duration or extended cyclic prefix duration. For example considering FIG. 12, UE1 is transmitting to UE2 using D2D communication (or direct communication) and UE1 is also communicating with the base station. Here, when UE1 is allocated a resource for D2D communication, it can transmit to UE2 using a OFDM waveform. UE1 may use an extended CP (as shown in FIG. 12) or use a normal CP (not shown in FIG. 12) while transmitting using the OFDM waveform. However, when UE1 is allocated a resource for transmission to the base station, it transmits on that resource using a SC-FDMA based waveform. The cyclic prefix used for UE1 to base station communication and UE1 to UE2 communication may be different. When UE1 transmits to UE2 using an OFDM based waveform, the transmission of UE1 can include a frequency shift that is equivalent to one half of the subcarrier spacing used for LTE transmissions. Typically, the subcarrier spacing used for LTE transmissions is 15 kHz. Given this, when UE1 transmits to UE2 using OFDM waveform, it can shift its transmissions (relative to SC-FDMA transmissions made while transmitting to the base station) by 7.5 kHz.

In some implementations, UE1 includes an extra subcarrier (typically the middle subcarrier in frequency domain) to compensate for DC offset-related hardware imperfections due to direct conversion transceivers. In this example, UE2 can tune its receiver to receive OFDM-based transmissions both when receiving from the base station and when receiving from UE1. In implementations, where UE1 does not use a frequency shift (that is equivalent to one half of the subcarrier spacing used for LTE) and does not use an extra subcarrier for transmitting to UE2, the receiving UE, i.e., UE2: (1) when the base station assigns UE2 to receive downlink transmissions from the base station, UE2 has to tune its receiver to receive an OFDM baseband waveform without any frequency shift and with an extra subcarrier; and (2) when the base station assigns UE2 to receive transmissions from UE1, UE2 has to tune its receiver to receive an OFDM baseband waveform with a frequency shift (relative to transmission received from the base station) and without an extra subcarrier (relative to transmission received from the base station). In this example, the complexity of UE2's receiver is slightly reduced since it can use a single OFDM receiver for receiving from both the base station and UE1.

According to a fifth set of embodiments, if a UE is performing D2D transmission in subframe n and has an UL grant (for transmission to the base station) in subframe n+1, it may be necessary to ensure that the UE completes its D2D transmission before transmitting on the UL.

If the D2D-transmitting UE applies a delay, as shown in FIGS. 8A, 8B, and 9, for example, the D2D transmission would extend into the next subframe. One embodiment uses the following techniques to address this issue:

In one embodiment, if the UE is configured to transmit D2D in subframe n and is configured to transmit to the base station in sub frame n+1, the UE shortens subframe n. As transmission to base station in subframe n+1 is based on activity in subframe n+1-k (k>3), the base station signals whether to shorten subframe n. Alternatively, the transmitting UE includes a shortened subframe indicator or signature sequence in its transmission.

In another embodiment, if the UE is configured to transmit D2D in subframe n and is configured to transmit to the base station in sub frame n+1, the UE shortens subframe n+1 (the first symbol of the UL subframe is not transmitted). The base station knows that the subframe is shorter because it is aware of the resource allocation for D2D in subframe n and UL resource allocation in subframe n+1.

The last subframe of consecutive D2D subframes is typically shorter (regardless of whether n+1 is a subframe with a UL grant) than other D2D subframes. Thus, in one embodiment, the base station configures the D2D UEs to complete D2D communications before the end of the corresponding uplink subframe.

For all of the above techniques, the reduction should be at least the duration of the delay that the transmitting UE applies. If the receiving D2D UE advances its timing to receive the D2D transmission, as shown in FIGS. 10 and 11, the above problem may not Occur.

To illustrate another embodiment, assume that the UE is equipped with a single receiver (for DL reception and D2D reception on the UL frequency). Further assume that the UE receives DL in subframe n−1 and D2D in subframe n, and the receiving D2D UE advances its timing to receive the D2D transmission (FIGS. 10 and 11). Under these circumstances, the reception of DL from base station in subframe n−1 and D2D in subframe n may not be possible. That is, if the receiving UE applies a time advance, then the UE may need to either skip reception of a portion of DL subframe (the last subframe) or skip reception of a portion of D2D subframe. To address this issue, the UE shortens subframe n−1.

According to a sixth set of embodiments, the following hardware switching durations are used when switching between UE-base station and UE-UE communications. It is assumed that the UE has a single receiver that is used for both the DL reception and D2D reception and that D2D communication is performed on the UL frequency.

If the UE receives D2D in subframe n and subframe n+1 is a normal subframe: UE needs to switch its receiver from UL frequency to DL frequency and prepare its transmitter for UL transmission (if UL grant has been provided). This requires a duration of $T_{switch\_1}$.

If subframe n is a normal subframe and the UE receives D2D in subframe n+1: UE has to switch its receiver from DL frequency to UL frequency and turn off its transmitter. This requires a duration of $T_{switch\_2}$.

If the UE transmits D2D in subframe n and subframe n+1 is a normal subframe: No switching periods are needed.

If subframe n is a normal subframe and the UE transmits D2D in subframe n+1: No switching periods are needed.

Figure 14:
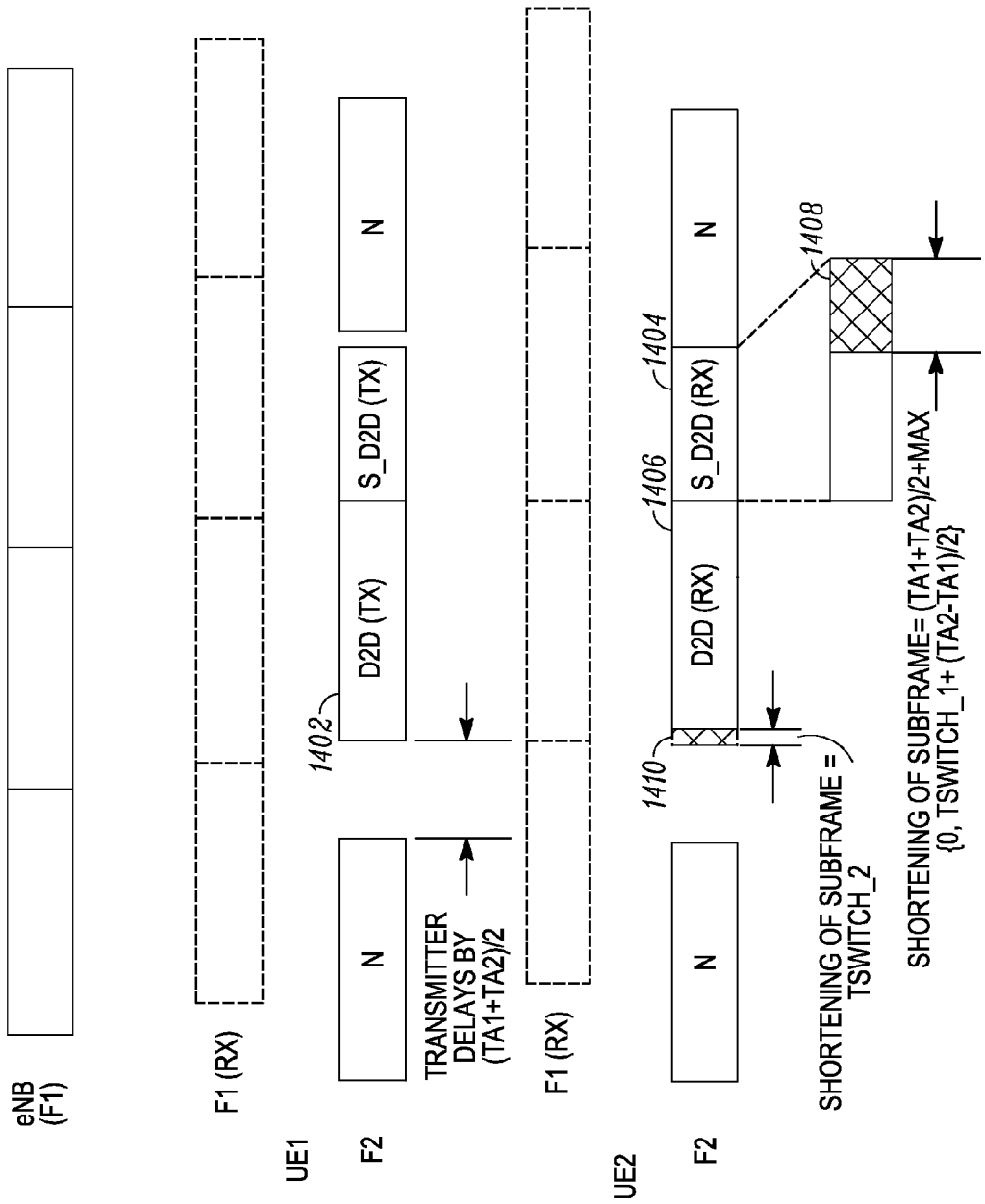
FIG. 14 illustrates an embodiment in which the transmitting D2D device delays its transmission and the last D2D subframe in a sequence of subframes is shortened.

Case 1: Referring to FIG. 14, assume that the transmitting D2D device UE1 delays its D2D transmission 1402 (see also 802 of FIG. 8A). Further assume that the last D2D subframe 1404 in a sequence of subframes is shortened as shown in FIG. 14 at the end of the subframe (assuming the D2D UEs are close to each other and thus $T_{Prop,D2D} \approx 0$). The duration 1408 by which the subframe 1404 is shortened is $$\frac{TA1 + TA2}{2} + \max\left(0, T_{switch\_1} + \frac{TA2 - TA1}{2}\right)$$

In this example, the duration $T_{switch\_2}$ (reference number 1410) is included in the first subframe 1406 in the sequence, resulting in the first subframe 1406 being reduced by $T_{switch\_2}$ at its beginning. Alternatively, the duration $T_{switch\_2}$ can be added to the time reduction experienced by the last subframe 1404.

In one embodiment, the criteria for determining the amount of reduction in the last subframe of the sequence are as follows:

UE2's receiver needs to switch from the UL frequency to the DL frequency: $T_{switch\_1}$.

UE1 needs to complete D2D transmission before starting next UL subframe, i.e., the delay in UE1 transmit timing: Required reduction amount is $$\frac{TA1 + TA2}{2}.$$

UE2 needs to complete D2D reception before uplink tx in the next subframe—The remainder of the reduction needed for this is based on the time difference between the starts of uplink subframes of UE1 and UE2, which is $$\frac{TA2 - TA1}{2}.$$

The reduction needed is $$\max\left(0, \frac{TA2 - TA1}{2}\right)$$

(i.e., 0 when TA1 is larger than TA2).

Turning to FIG. 14, the required reduction of the last subframe 1404 is $$\frac{TA1 + TA2}{2} + \max\left(0, T_{switch\_1} + \frac{TA2 - TA1}{2}\right).$$

Note that the assumption is that $T_{switch\_1}$ cannot overlap $$\frac{TA2 - TA1}{2},$$

i.e., the UE2 architecture does not support simultaneous transmission on UL frequency F2 to the base station while its receiver is switching from D2D reception on F2 to base-station reception on F1.

Figure 15:
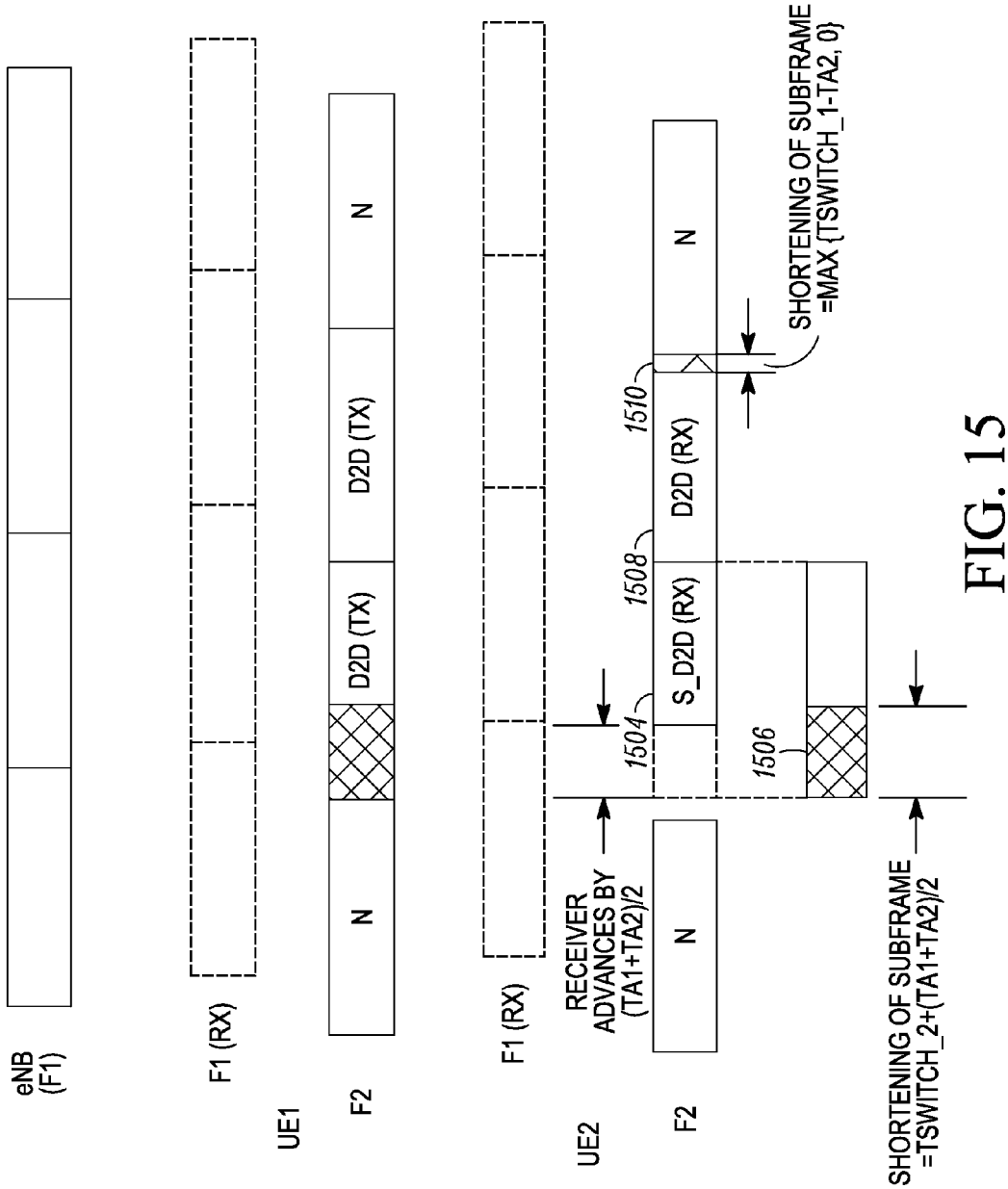
FIG. 15 illustrates an embodiment in which the transmitting D2D device delays its transmission, and the first D2D subframe in a sequence of subframes is shortened.

Case 2: Referring to FIG. 15, assume that the receiving D2D device UE2 advances its D2D reception. Further assume that the first D2D subframe 1504 in a sequence of D2D subframes is shortened as shown in FIG. 15. The duration 1506 by which the subframe 1504 is shortened is $$T_{switch\_2} + \frac{TA1 + TA2}{2}$$

(assuming the D2D UEs are close to each other, $T_{Prop,D2D} \approx 0$). Depending on the duration of TA2, the last D2D 1508 subframe may need to be shortened by a duration 1510 of max ($T_{switch\_1}$–TA2,0)—for the case of UE2 architecture that supports simultaneous transmission on UL frequency F2 to the base station while its receiver is switching from D2D reception on F2 to base-station reception on F1. If the UE2 architecture does not support transmission on the UL frequency F2 to the base station while its receiver is switching from D2D reception on F2 to base-station reception on F1, then the duration of reduction of the last subframe is $$\max\left(0, \frac{TA2 - TA1}{2}\right) + T_{switch\_1}.$$

In one embodiment, the criteria for determining the amount of reduction in the first subframe of the sequence are as follows:

UE2 has to complete DL reception on F1 before start of D2D reception: Duration of reduction required is $$\frac{TA1 + TA2}{2}.$$

UE2 has to complete UL transmission on F2 before start of D2D reception: Duration of reduction required is $$\frac{TA2 - TA1}{2}.$$

UE2 needs time to switch from F1 to F2: The duration of reduction required is $T_{switch\_2}$.

UE1 has to complete UL Tx on F2 before start of D2D transmission: Duration of reduction required is 0.

Consequently, the required reduction of the subframe is $$\max\left(T_{switch\_2} + \frac{TA1 + TA2}{2}, \frac{TA1 - TA2}{2}\right) = T_{switch\_2} + \frac{TA1 + TA2}{2}$$

If a UE is configured to perform D2D transmission in subframe n, it is unable to transmit UL signals to the network (UL frequency is used for D2D).

If a UE is configured to perform D2D reception in subframe n, it is generally unable to receive DL from the base station in subframe n (because the receiver is receiving D2D), and it is unable to transmit UL to the network (UL frequency is used for D2D). Additionally, the UE is unable to send HARQ feedback for subframe n−4. Consequently, subframe n−4 is unusable for base station to UE (D2D UE) transmission. The base station could choose to schedule packets that do not require acknowledgement in subframe n−4.

The following are options for configuring subframes for D2D communication according to an embodiment of the invention:

Subframes spaced by a multiple of 4 are assigned for D2D for some duration (e.g., . . . n−4, n, n+4, n+8, . . . are assigned for D2D).

A contiguous sequence of subframes is assigned for D2D (i.e., a D2D gap).

In some cases the UE has to abandon D2D transmission or reception to receive the DL from the base station. For example, in idle mode, the UE has to receive paging in specific subframes. The UE also has to perform measurements of the DL. In such cases, the UEs communicate with each other regarding which subframes assigned for D2D cannot be used for D2D and are available to be used for other purposes.

In this set of embodiments, one or more of the following approaches are used to allow UEs to obtain timing information for their D2D partners (e.g., in conjunction with the First Set of Embodiments and the Second Set of Embodiments):

UEs report timing advance being used to base station. Base station 102 sends timing advance information of each D2D UE to every other D2D UE. Note that the timing advance being used can be different from the TA value assigned by the base station. This is due to autonomous adjustments being made by one or more of the UEs.

UEs exchange timing advance information on a UE to UE data path via network.

Network signals UEs SRS configurations to each other and UEs detect each other's SRS to determine propagation delay.

As a UE (UE1) moves in the cell, its uplink timing advance is updated by the base station. However, UE2 is unaware of the updated timing advance of UE1. Accordingly, embodiments of the disclosure use the following approaches to update the D2D UEs regarding the timing advance changes of other D2D UEs. These approaches can be used in conjunction with the First Set of Embodiments and with the Second Set of Embodiments:

1. When UE gets a new TA command or applies a significant update to its TA, it communicates directly with its partner UE to provide the updated TA. This can be done based on the timing advance changing by more than a predefined quantity.
2. When a base station sends a new TA command to UE1, the base station indicates the updated TA value of UE1 to UE2, if UE1 and UE2 have been assigned D2D resources. For example, a new D2D timing update command can be designed which provides updated TAs of UEs to each other and is either jointly or separately transmitted to the two UEs.

There are many situations in which the base station loses its link to one or more of the D2D UEs. Accordingly, embodiments of the disclosure use the following approaches to handle such situations.

Scenario A: UE1 and UE2 are initially served by a single base station and a D2D link is established. Then UE2 drops its connection to the base station.

Prior to dropping the connection to the base station, UE2 obtains UE1's timing advance.

UE2 drops the connection to the base station.

UE2 sets its timing advance (for D2D communication) to be the larger of its own timing advance prior to disconnecting and UE1's timing advance. Following that, the D2D communication can be based on time-advancing the receiving UE or time-delaying the transmitting UE $$\left(by \frac{TA_{UE1} + TA_{UE2}}{2}\right)$$

In another implementation, if UE1 and UE2 are close to each other, then UE2 sets its timing advance to equal that of UE1. For example, if the transmit power required for the last successful D2D transmission or reception is below a threshold, then UE2 can use UE1's timing advance.

Scenario B: UE1 and UE2 are initially served by a single base station and a D2D link is established. Then UE2 is handed off to a neighbor base station. In an embodiment of the disclosure, re-establishing D2D synchronization is performed by one of the following techniques:

Upon handover completion (e.g., in the handover complete message) UE2 provides to its new serving cell (base station 2) the timing advance applied, the DL time offset between the old serving cell (base station) and the new serving cell as seen at UE2, and any subframe offset. The base station computes a virtual timing advance for UE2: The time at which UE2 transmits its UL to base station, relative to the DL timing of the base station. The virtual timing advance of UE2 is provided to UE1.

Upon handover completion, the base station and base station 2 coordinate to determine a virtual timing advance of UE2 relative to the base station. (The pieces of information needed for this are: DL time offset between the base station and base station 2, TA assigned to UE2, and any subframe offset between the two network entities.)

Scenario C: UE1 and UE2 are initially served by a single base station and a D2D link is established. Then UE2 moves out of coverage of the network (while still in range for D2D communication with UE1).

UE2 obtains UE1's SRS configuration prior to going out of network coverage.

After moving out of coverage, UE2 uses UE1's SRS as a timing reference. (UE1 may have to be provided a configuration for frequent SRS transmissions.) UE2 calculates new D2D transmit and receive timing with UE1's SRS as the reference.

Turning to FIGS. 16 through 20, the steps carried out in other embodiments are now described.

Figure 16:
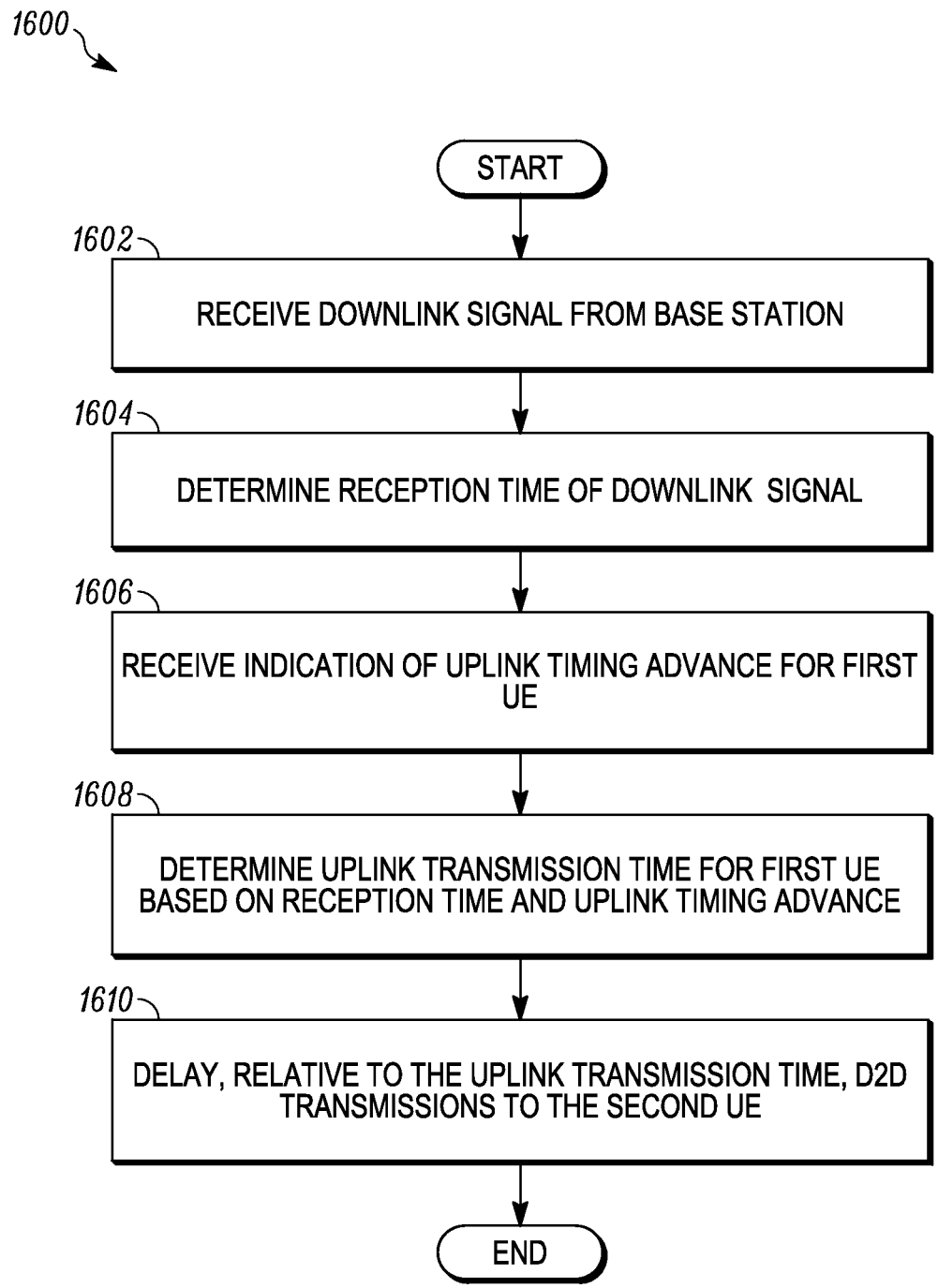
FIGS. 16 through 20 show flowcharts of various methods that are carried out in embodiments of the disclosure.

At step 1602 of FIG. 16, a first UE receives a DL signal from a base station. At step 1604, the first UE determines the reception time of the DL signal. At step 1606, the first UE receives an indication of a TA for UL communications from the first UE to the base station. At step 1608, the first UE determines an UL transmission time for the first UE based on the determined DL signal reception time and the received TA. At step 1610, the first UE delays D2D transmissions to the second UE. This delay is relative to the UL transmission time. Furthermore, the delay is based on a TA applied by the second UE for UL communications to the base station.

Figure 17:
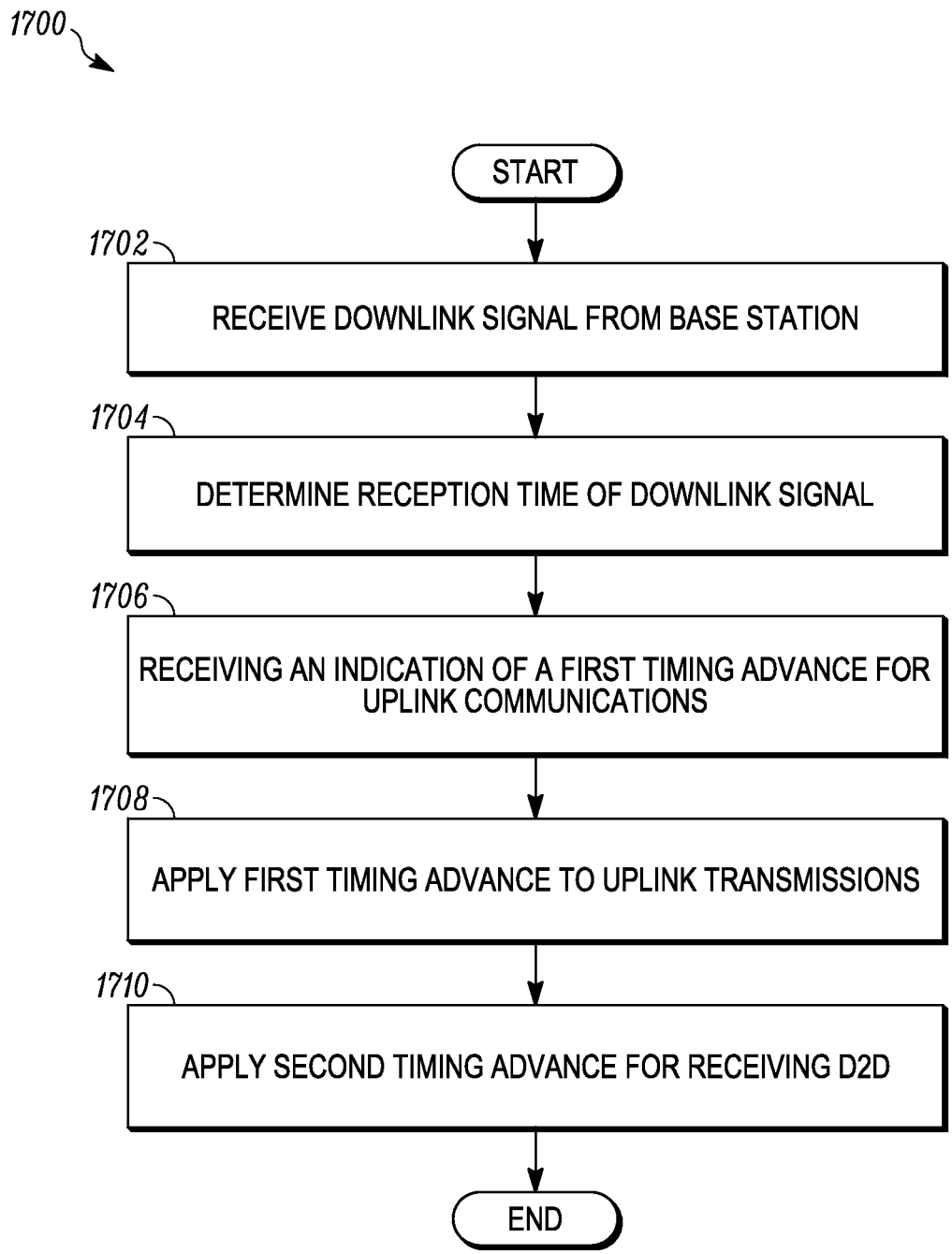

Turning to FIG. 17, in step 1702, a first UE receives a DL signal from a base station. At step 1704, the first UE determines the reception time of the DL signal. At step 1706, the first UE receives an indication of a first timing advance for uplink communications from the first UE to the base station. At step 1708, the first UE applies a first TA for UL communications from the first UE to the base station. The value of the first TA is the timing advance relative to the determined DL signal reception time. At step 1710, the first UE applies a second TA for reception of D2D communications from a second UE. The value of the second TA is the timing advance relative to the determined DL signal reception time. The second TA is based on a third TA used by the second UE for uplink transmissions to the base station.

Figure 18:
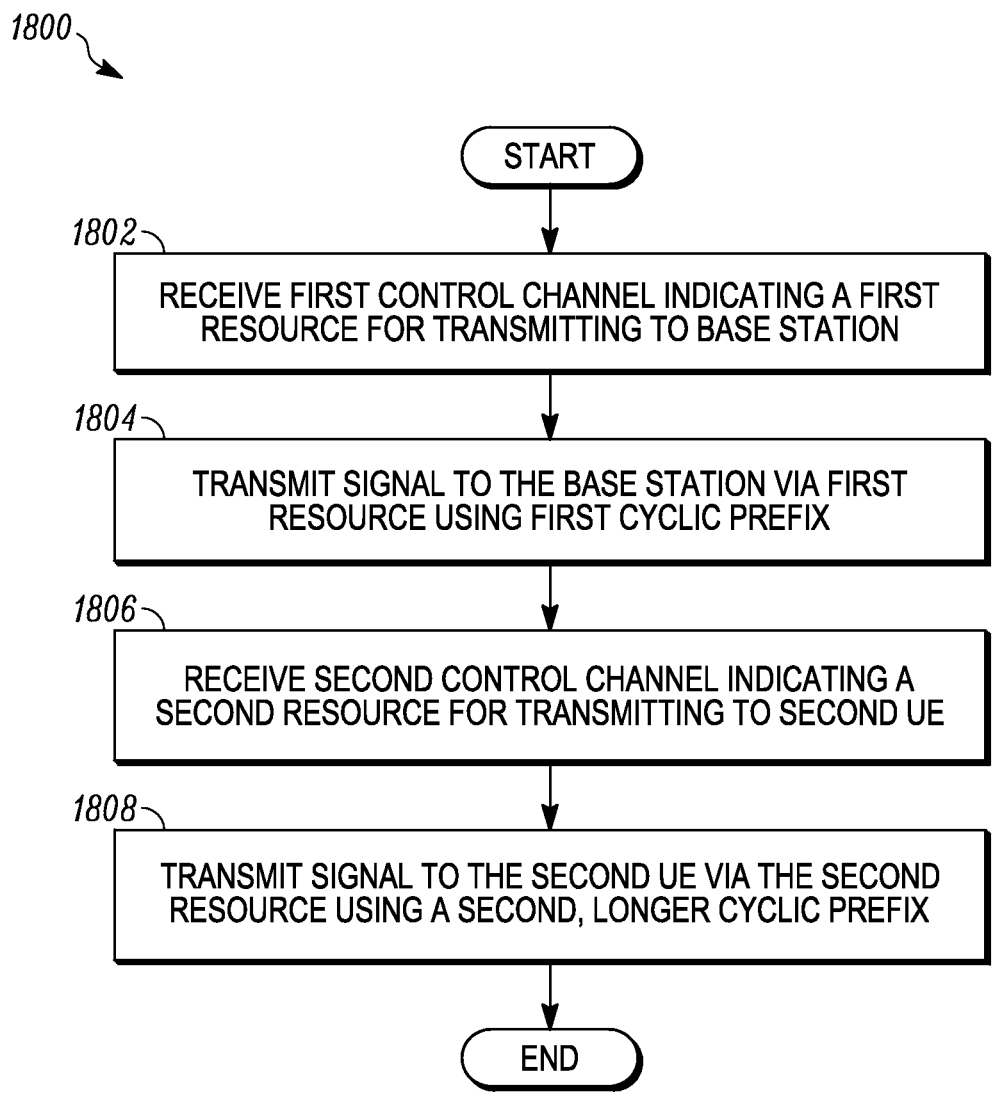

Turning to FIG. 18, in step 1802, the first UE receives a first control channel indicating a first resource (e.g., a time-frequency resource) for transmitting to a base station. At step 1804, the first UE transmits a signal to the base station via the first resource using a first cyclic prefix. The first UE performs step 1804 in response to receiving the first control channel. At step 1806, the first UE receives a second control channel indicating a second resource for transmitting to a second UE. At step 1808, the first UE transmits a signal to the second UE via the first resource using a second cyclic prefix that is longer than the first cyclic prefix. The first UE performs step 1808 in response to receiving the second control channel.

Figure 19:
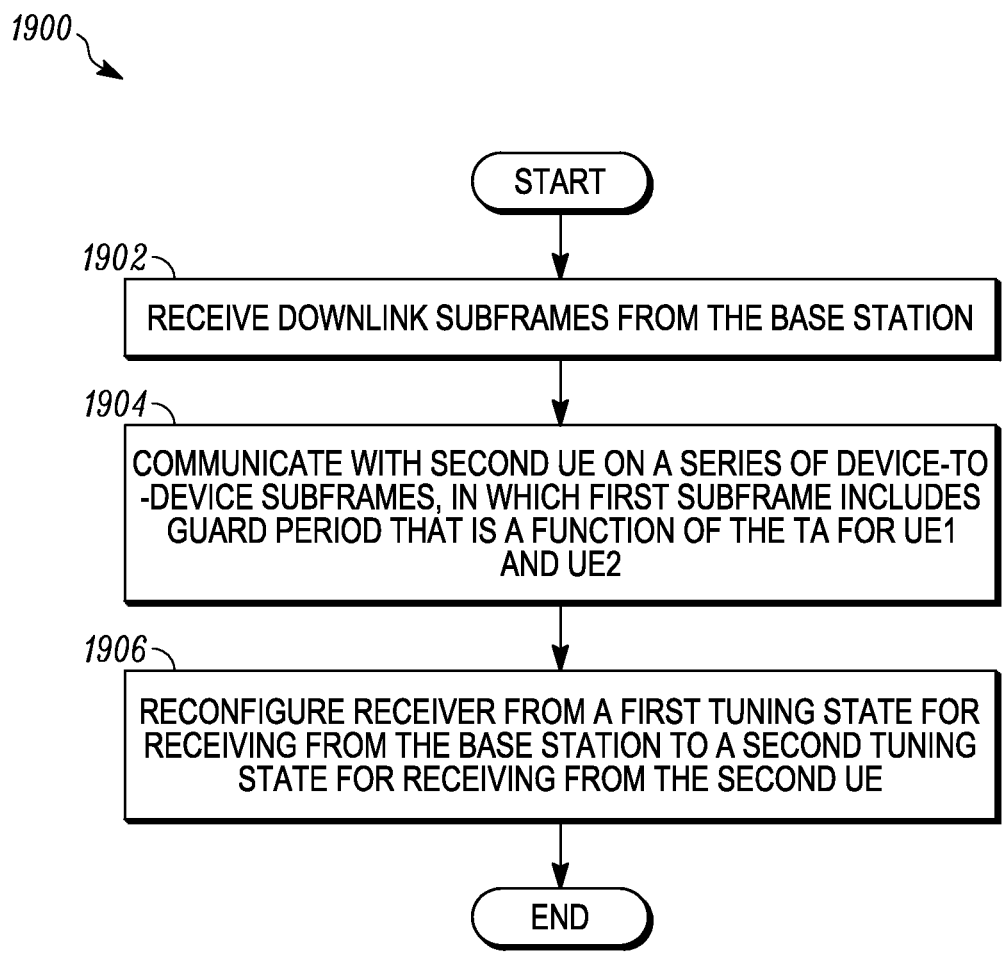

Turning to FIG. 19, in step 1902, the first UE receives DL subframes from a base station. At step 1904, the first UE changes the format of the first subframe of the series so that it includes a guard period that is a function of a TA of the first UE and a TA of the second UE. At step 1906, during the guard period, the first UE reconfigures its receiver from a first tuning state to a second tuning state. The first tuning state is directed to receiving from the base station. The second tuning state is directed to receiving from the second UE. At step 1908, the first UE communicates with the second UE on a series of device-to-device subframes including the reformatted first subframe.

Figure 20:
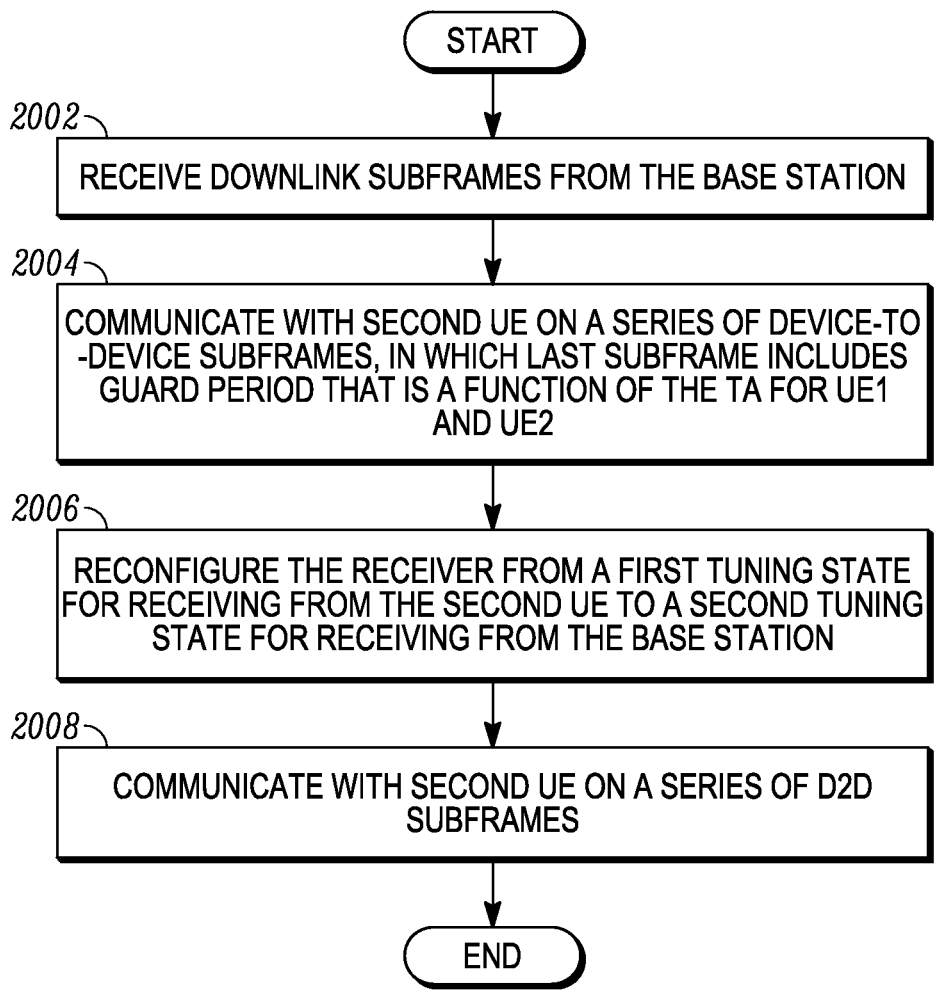

Turning to FIG. 20, in step 2002, the first UE receives DL subframes from a base station. At step 2004, the first UE changes the format of the last subframe of the series so that it includes a guard period that is a function of a TA of the first UE and TA of the second UE. At step 2006, during the guard period, the first UE reconfigures its receiver from a first tuning state to a second tuning state. The first tuning state is directed to receiving from the base station. The second tuning state is directed to receiving from the second UE. At step 2008, the first UE communicates with the second UE on a series of device-to-device subframes, including the reformatted last subframe.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. In a wireless network that includes a base station, a method for a first UE to perform device-to-device communication with a second UE, the method comprising:
    receiving a downlink signal from the base station;
    determining the reception time of the downlink signal;
    receiving an indication of a timing advance for uplink communications from the first UE to the base station;
    based on the determined downlink signal reception time and the indicated timing advance, determining an uplink transmission time for the first UE for uplink communications to the base station; and
    delaying, by a period of time relative to the determined uplink transmission time, device-to-device transmissions to the second UE, wherein the period of time is calculated, in part, by adding the timing advance for uplink communications from the first UE to the base station and a timing advance applied by the second UE for uplink communications to the base station.

2. The method of claim 1 wherein the period of time is received from the base station.

3. The method of claim 1 wherein the period of time is further based on the propagation delay between the first UE and second UE.

4. The method of claim 3 further comprising:
    detecting the second UE's reference signal; and
    determining the propagation delay based on the detected reference signal.

5. The method of claim 1:
    wherein the period of time is $$\max\left(0, \frac{TA_{Tx} + TA_{Rx}}{2} - T_{Prop,D2D}\right);$$

wherein $TA_{Tx}$ is the timing advance for the first UE;
    wherein $TA_{Rx}$ is the timing advance for the second UE; and
    wherein $T_{Prop,D2D}$ is a propagation delay between the first UE and second UE.

6. The method of claim 1:
    wherein the period of time is $$\max\left(0, \frac{TA_{Tx} + TA_{Rx}}{2} - T_{Prop,D2D} + T_{Rx\_switch}\right);$$

wherein $TA_{Tx}$ is the timing advance for the first UE;
    wherein $TA_{Rx}$ is the timing advance for the second UE;
    wherein $T_{Prop,D2D}$ is a propagation delay between the first UE and second UE; and
    wherein $T_{Rx\_switch}$ is a receiver retuning time.

7. The method of claim 1 further comprising:
    receiving information regarding the second UE's timing advance from the base station.

8. The method of claim 1 further comprising:
    exchanging timing advance information with the second UE.

9. The method of claim 1 further comprising:
    receiving an indication of a new timing advance from the base station; and
    updating the second UE regarding the new timing advance.

10. In a wireless network that includes a base station, a method for a first UE to perform device-to-device communication with a second UE, the method comprising:
    receiving a downlink signal from the base station;
    determining the reception time of the downlink signal;
    receiving an indication of a first timing advance for uplink communications from the first UE to the base station;
    applying the first timing advance to perform uplink transmissions to the base station, wherein the first timing advance is relative to the determined downlink signal reception time; and
    applying a second timing advance for reception of device-to-device communication from the second UE;
    wherein the second timing advance is relative to the determined downlink signal reception time; and
    wherein the second timing advance is calculated, in part, by adding the timing advance for uplink communications from the first UE to the base station and a third timing advance used by the second UE for uplink communications to the base station.

11. The method of claim 10 wherein the second timing advance is based on the propagation delay between the first UE and a second UE.

12. The method of claim 10 further comprising:
    detecting the second UE's reference signal; and
    determining a propagation delay between the first UE and the second UE based on the detected reference signal.

13. The method of claim 10 further comprising:
    receiving information regarding the second UE's timing advance from the base station.

14. A UE configured to perform device-to-device communication with a second UE in a wireless network that includes a base station, the UE comprising:

a processor;

an antenna; and a transceiver configured to:

receive downlink signals from the base station via the antenna, wherein at least one of the downlink signals includes data indicating a timing advance for uplink communications from the first UE to the base station; and provide the timing advance data to the processor;

wherein the processor is configured to:

determine the reception time of one or more of the downlink signals;

receive the timing advance data from the transceiver;

based on the determined downlink signal reception time and the indicated timing advance, determine an uplink transmission time for the first UE for uplink communications to the base station; and delay, by a period of time relative to the determined uplink transmission time, device-to-device transmissions to the second UE, wherein the period of time is calculated, in part, by adding the timing advance for uplink communications from the first UE to the base station and a timing advance applied by the second UE for uplink communications to the base station.

* * * * *